United States Patent
Mizuochi et al.

(10) Patent No.: US 11,323,600 B2
(45) Date of Patent: May 3, 2022

(54) IMAGING APPARATUS, LENS APPARATUS, AND INTERMEDIATE ACCESSORY

(71) Applicant: CANON KABUSHIKI KAISHA, Tokyo (JP)

(72) Inventors: Fuya Mizuochi, Saitama (JP); Toru Ohara, Utsunomiya (JP); Yasuyuki Watazawa, Tokyo (JP); Naoto Fujihashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/230,802

(22) Filed: Apr. 14, 2021

(65) Prior Publication Data

US 2021/0234998 A1     Jul. 29, 2021

Related U.S. Application Data

(63) Continuation of application No. 16/738,960, filed on Jan. 9, 2020, now Pat. No. 10,992,846, which is a continuation of application No. 15/992,697, filed on May 30, 2018, now Pat. No. 10,602,038.

(30) Foreign Application Priority Data

May 31, 2017    (JP) .............................. JP2017-108256

(51) Int. Cl.
| | |
|---|---|
| *H04N 5/217* | (2011.01) |
| *H04N 5/225* | (2006.01) |
| *G03B 17/14* | (2021.01) |
| *G03B 7/20* | (2021.01) |
| *G03B 17/56* | (2021.01) |
| *H04N 5/06* | (2006.01) |

(52) U.S. Cl.
CPC ............. *H04N 5/2253* (2013.01); *G03B 7/20* (2013.01); *G03B 17/14* (2013.01); *G03B 17/56* (2013.01); *H04N 5/06* (2013.01); *H04N 5/2254* (2013.01)

(58) Field of Classification Search
CPC .......... G03B 7/20; G03B 17/56; G03B 17/14; H04N 5/2253; H04N 5/06; H04N 5/2254
USPC ........................................................ 348/241
See application file for complete search history.

(56) References Cited

U.S. PATENT DOCUMENTS

| | | | |
|---|---|---|---|
| 10,602,048 B2 | 3/2020 | Tsukamoto et al. | |
| 2006/0165401 A1 | 7/2006 | Doi et al. | |
| 2011/0273607 A1 | 11/2011 | Nonaka et al. | |
| 2012/0051732 A1* | 3/2012 | Aoki ...................... | G03B 17/02 396/374 |
| 2012/0105711 A1 | 5/2012 | Kudo et al. | |

(Continued)

FOREIGN PATENT DOCUMENTS

| | | |
|---|---|---|
| JP | 2002244188 A | 8/2002 |
| JP | 2014021414 A | 2/2014 |

*Primary Examiner* — Usman A Khan
(74) *Attorney, Agent, or Firm* — Canon U.S.A., Inc. IP Division

(57) ABSTRACT

A lens apparatus is mountable to a camera body. The camera body has multiple electric contacts. Of these multiple electric contacts, when mounting the lens apparatus to the camera body, electric contacts used for second communication or third communication come into contact with an electric contact provided to the lens apparatus before electric contacts used for first communication, when mounting the lens apparatus to the camera body.

23 Claims, 17 Drawing Sheets

(56) References Cited

U.S. PATENT DOCUMENTS

2013/0287388 A1* 10/2013 Nishio ................ G03B 17/565
    396/532
2018/0352140 A1* 12/2018 Tsukamoto ........ H04N 5/23209

* cited by examiner

IMAGING APPARATUS, LENS APPARATUS, AND INTERMEDIATE ACCESSORY

CROSS-REFERENCE TO RELATED APPLICATIONS

This application is a continuation of U.S. patent application Ser. No. 16/738,960, filed Jan. 9, 2020, which is a continuation of U.S. patent application Ser. No. 15/992,697, filed on May 30, 2018, now U.S. Pat. No. 10,602,038, which claims the benefit of Japanese Patent Application No. 2017-108256 filed May 31, 2017, all of which are hereby incorporated by reference herein in their entirety.

BACKGROUND OF THE INVENTION

Field of the Invention

The present invention relates to an imaging apparatus, a lens apparatus (lens device), and an intermediate accessory, that are capable of communicating with each other.

Description of the Related Art

Accessory devices such as lens apparatuses that are detachably mountable to an imaging apparatus operate by receiving a supply of power from the imaging apparatus, communicating with the imaging apparatus, and so forth. Accordingly, multiple electric contacts are provided both on a mount unit at the imaging apparatus and a mount unit at the accessory device. When an accessory device is mounted to the imaging apparatus, the electric contacts at the camera body side and the electric contacts at the accessory device side come into contact, and the imaging apparatus and the accessory device are electrically connected.

US2012/0063016 describes an imaging apparatus and lens apparatus where two electric contact groups, which perform different communication from each other, are provided.

SUMMARY OF THE INVENTION

Generally, a lens apparatus and imaging apparatus are coupled by bayonet coupling. Accordingly, when mounting the lens apparatus to the imaging apparatus, the electric contacts at the imaging apparatus side slide over the electric contacts at the lens apparatus side, and wear. Such wear of the electric contacts can cause problems in communication between the imaging apparatus and lens apparatus.

Since the amount of wear of electric contacts differs depending on the position, it is preferable to decide the order of array of the electric contacts in accordance with the role of each in communication, when providing multiple electric contacts to perform communication with a lens apparatus by multiple communication methods, as with the imaging apparatus described in US2012/0063016.

It has been found desirable to reduce occurrence of poor communication due to wear of electric contacts of an imaging apparatus.

According to an aspect of the present invention, an imaging apparatus to which a lens apparatus is detachably mountable includes a mount unit where a plurality of electric contacts are arrayed. The plurality of electric contacts include a first electric contact group used to perform first communication with a lens apparatus mounted to the imaging apparatus, and a second electric contact group used to perform communication that is different from the first communication with a lens apparatus mounted to the imaging apparatus. The imaging apparatus is capable of mounting a first lens apparatus that is capable of communication using the first electric contact group but not capable of communication using the second electric contact group, and a second lens apparatus that is capable of communication using the first electric contact group and communication using the second electric contact group. Where direction of movement of the lens apparatus with respect to the imaging apparatus when mounting the lens apparatus to the imaging apparatus is a first direction, the second electric contact group and the first electric contact group are arrayed in the order of the second electric contact group and the first electric contact group in the first direction.

According to another aspect of the present invention, an imaging apparatus to which a lens apparatus is detachably mountable includes a mount unit where a plurality of electric contacts are arrayed. The plurality of electric contacts include a first electric contact group used to perform first communication with a lens apparatus mounted to the imaging apparatus, and a second electric contact group used to perform communication that is different from the first communication with a lens apparatus mounted to the imaging apparatus. The imaging apparatus is capable of mounting a first lens apparatus that is capable of communication using the first electric contact group but not capable of communication using the second electric contact group, and a second lens apparatus that is capable of communication using the first electric contact group and communication using the second electric contact group. The plurality of electric contacts are arrayed such that when the second lens apparatus is mounted to the imaging apparatus, the second electric contact group and an electric contact provided to the second lens apparatus come into contact before the first electric contact group and an electric contact provided to the second lens apparatus come into contact.

According to another aspect of the present invention, an imaging apparatus to which a lens apparatus is detachably mountable includes a mount unit where a plurality of electric contacts are arrayed. The plurality of electric contacts include a first electric contact configured to be capable of outputting a clock signal, a second electric contact configured to be capable of transmitting data to the lens apparatus synchronously with the clock signal, a third electric contact configured to be capable of receiving data transmitted synchronously with the clock signal, and a fourth electric contact configured to be capable of receiving data transmitted from the lens apparatus in accordance with data transmitted from the second electric contact. The plurality of electric contacts are arrayed such that when the lens apparatus is mounted to the imaging apparatus, the fourth electric contact and an electric contact provided to the lens apparatus come into contact before any one of the first through third electric contacts and an electric contact provided to the lens apparatus come into contact.

According to another aspect of the present invention, a lens apparatus detachably mountable to an imaging apparatus includes a mount unit. The imaging apparatus is capable of mounting a plurality of lens apparatuses including a first lens apparatus that is capable of communication using a first electric contact group that is part of the plurality of electric contacts provided to the imaging apparatus, but not capable of communication using a second electric contact group that is different from the first electric contact group, and a second lens apparatus that is capable of communication using the first electric contact group and communication using the second electric contact group. The mount unit of the lens apparatus is configured to be capable of coupling with the imaging apparatus. A plurality of electric contacts including a third electric contact group for performing communication with the imaging apparatus using the first electric contact group are provided to the mount unit. The plurality of electric contacts at the lens side are arrayed such that when the lens apparatus is mounted to the imaging apparatus, an electric contact included in the third electric contact group comes into contact with an electric contact included in the first electric contact group after coming into contact with an electric contact included in the second electric contact group.

According to another aspect of the present invention, a lens apparatus detachably mountable to an imaging apparatus includes a mount unit. The imaging apparatus includes a plurality of electric contacts including a first electric contact configured to be capable of outputting a clock signal, a second electric contact configured to be capable of transmitting data synchronously with the clock signal, a third electric contact configured to be capable of receiving data transmitted synchronously with the clock signal, and a fourth electric contact configured to be capable of receiving data transmitted in accordance with data transmitted from the second electric contact. A plurality of electric contacts including a fifth electric contact configured to be capable of receiving the clock signal, a sixth electric contact configured to be capable of receiving data transmitted from the imaging apparatus synchronously with the clock signal, and a seventh electric contact configured to be capable of transmitting data to the imaging apparatus synchronously with the clock signal, are arrayed on the mount unit of the lens apparatus. The fifth through seventh electric contacts are arrayed on the mount unit such that, when mounting the lens apparatus to the imaging apparatus, the fifth through seventh electric contacts come into contact with the first through third electric contacts after coming into contact with the fourth electric contact.

According to another aspect of the present invention, an accessory capable of being mounted between an imaging apparatus and a lens apparatus includes a mount unit. The imaging apparatus is capable of mounting a plurality of lens apparatuses including a first lens apparatus that is capable of communication using a first electric contact group that is part of the plurality of electric contacts provided to the imaging apparatus, but not capable of communication using a second electric contact group that is different from the first electric contact group, and a second lens apparatus that is capable of communication using the first electric contact group and communication using the second electric contact group. A plurality of electric contacts, including a fourth electric contact group made up of an electric contact that comes into contact with an electric contact included in the first electric contact group in a state where the accessory is mounted to the imaging apparatus, are arrayed on the mount unit of the accessory. The electric contact included in the fourth electric contact group is arrayed on the mount unit so as to come into contact with an electric contact included in the first electric contact group after coming into contact with an electric contact included in the second electric contact group, when mounting the accessory to the imaging apparatus.

According to another aspect of the present invention, an accessory capable of being mounted between an imaging apparatus and a lens apparatus includes a mount unit. The imaging apparatus includes a plurality of electric contacts including a first electric contact configured to be capable of outputting a clock signal, a second electric contact configured to be capable of transmitting data synchronously with the clock signal, a third electric contact configured to be capable of receiving data transmitted synchronously with the clock signal, and a fourth electric contact configured to be capable of receiving data transmitted in accordance with data transmitted from the second electric contact. A plurality of electric contacts including an eighth electric contact configured to come into contact with the first electric contact in a state of being mounted to the imaging apparatus, a ninth electric contact configured to come into contact with the second electric contact in a state of being mounted to the imaging apparatus, and a tenth electric contact configured to come into contact with the third electric contact in a state of being mounted to the imaging apparatus, are arrayed on the mount unit of the accessory. When mounting the accessory to the imaging apparatus, the eighth through tenth electric contacts are arrayed on the mount so as to come into contact with the first through third electric contacts after coming into contact with the fourth electric contact.

According to another aspect of the present invention, a camera system includes an imaging apparatus and a lens apparatus configured to be detachably mountable to the imaging apparatus. The imaging apparatus includes a first mount unit on which are arrayed a plurality of electric contacts, including a first electric contact group used to perform first communication with the lens apparatus mounted to the imaging apparatus, and a second electric contact group used to perform communication that is different from the first communication with a lens apparatus mounted to the imaging apparatus. The lens apparatus includes a second mount unit capable of coupling with the first mount unit, and on which are arrayed a plurality of electric contacts, including a third electric contact group used to perform communication with the imaging apparatus using the first electric contact group. The imaging apparatus is capable of mounting a first lens apparatus that is capable of communication using the first electric contact group but not capable of communication using the second electric contact group, and a second lens apparatus that is capable of communication using the first electric contact group and communication using the second electric contact group. With a direction of movement of the lens apparatus as to the imaging apparatus when mounting the lens apparatus to the imaging apparatus as a first direction, the second electric contact group and the first electric contact group are arrayed in the order of the second electric contact group and the first electric contact group in the first direction.

Further features of the present invention will become apparent from the following description of exemplary embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

DESCRIPTION OF THE EMBODIMENTS

Various types of terminology used in the specification of the present application will be described prior to the description relating to embodiments of the present invention. The term "accessory apparatus (device)" refers to a device that is mountable to an imaging apparatus (image pick-up apparatus). The imaging apparatus and accessory device are mounted by coupling of mount units that each has. Accessory devices include lens apparatuses (lens devices) having an image-taking optical system. Accessory devices also include an intermediate accessory mounted between a lens apparatus and the imaging apparatus body.

The term "mount unit (portion)" is a coupling unit, provided to each of the imaging apparatus and accessory device. The mount unit of the imaging apparatus and the mount unit of the accessory device each are provided with electric contacts (electric terminals) and the electric contacts provided to the respective mount units come into contact when the accessory device is mounted to the imaging apparatus. That is to say, the mount units not only serve to mechanically couple the imaging apparatus body and accessory device, but also to electrically connect the imaging apparatus body and accessory device.

Figure 1:
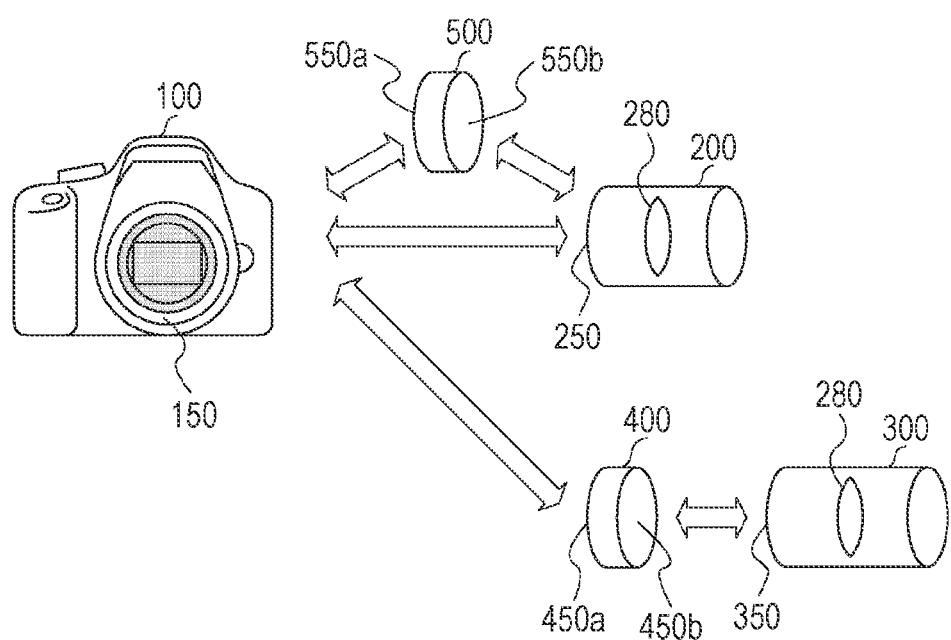
FIG. 1 is a diagram describing the mutual relation between an imaging apparatus, lens apparatus, and intermediate accessory device.

Next, the mutual relation between the imaging apparatus, lens apparatus, and intermediate accessory device according to an embodiment will be described with reference to FIG. 1. FIG. 1 illustrates the mutual relation among a camera body 100 serving as the imaging apparatus according to the present embodiment, a lens apparatus 200 according to the present embodiment, intermediate accessory devices 400 and 500 according to the present embodiment, and a lens apparatus 300 according to a conventional arrangement, which has a different configuration from the lens apparatus 200 according to the present embodiment. The arrows in FIG. 1 indicate that the devices that can be mounted to each other by coupling the respective mount units. The lens apparatus 200 has an image-taking optical system 280, and the lens apparatus 300 has an image-taking optical system 380. The camera body 100 has an imaging device such as a complementary metal-oxide semiconductor (CMOS) sensor, charge-coupled device (CCD) sensor, or the like. A subject can be taken by mounting the lens apparatus 200 or lens apparatus 300 on the camera body 100.

The lens apparatus 200, intermediate accessory device 500, and intermediate accessory device 400 can be directly mounted to the camera body 100. That is to say, a mount unit 250 of the lens apparatus 200, a mount unit 550a of the intermediate accessory device 500, and a mount unit 450a of the intermediate accessory device 400, have shapes that tenable coupling to a mount unit 150 of the camera body 100.

The intermediate accessory device 500 also has, besides the mount unit 550a serving as a first accessory mount unit mountable to the camera body 100, a mount unit 550b serving as a second accessory mount unit that has the same shape as the mount unit 150 of the camera body 100. Accordingly, the lens apparatus 200 can be mounted to the intermediate accessory device 500 as well. In other words, the lens apparatus 200 can be mounted to the camera body 100 via the intermediate accessory device 500. Also note that another intermediate accessory device (omitted from illustration) may be mounted between the lens apparatus 200 and the intermediate accessory device 500. In this case, two intermediate accessory devices will be mounted between the lens apparatus 200 and the camera body 100.

On the other hand, the shape of the mount unit 150 is such that a mount unit 350 of the lens apparatus 300 cannot be coupled thereto. Accordingly, the lens apparatus 300 cannot be directly mounted to the camera body 100. However, the lens apparatus 300 can be mounted to the camera body 100 via the intermediate accessory device 400 that has the mount unit (first accessory mount unit) 450a and mount unit (second accessory mount unit) 450b that can be mounted to the lens apparatus 300. Thus, any of multiple lens apparatuses including the lens apparatus 200 and lens apparatus 300 are selectively mounted to the camera body 100.

Figure 2A:
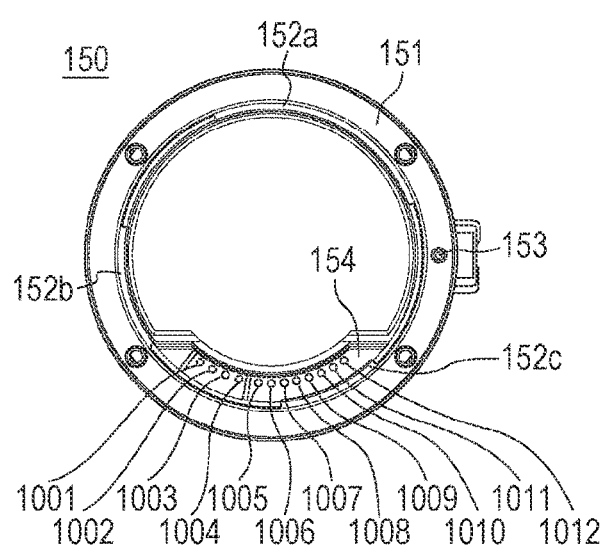
FIGS. 2A through 2D are schematic diagrams of mount units.
Figure 2B:
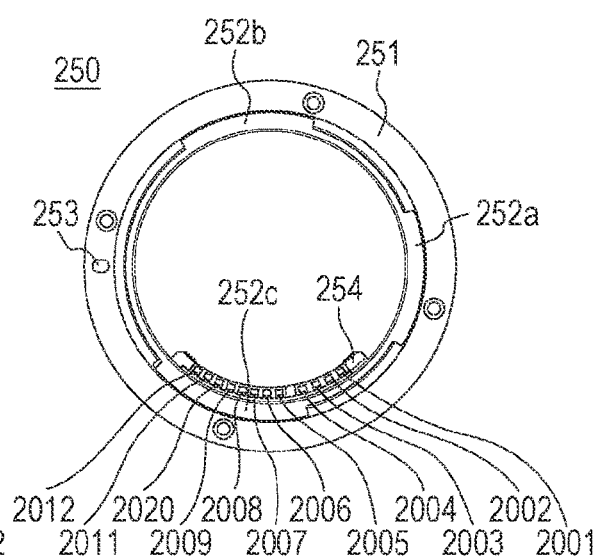
Figure 2C:
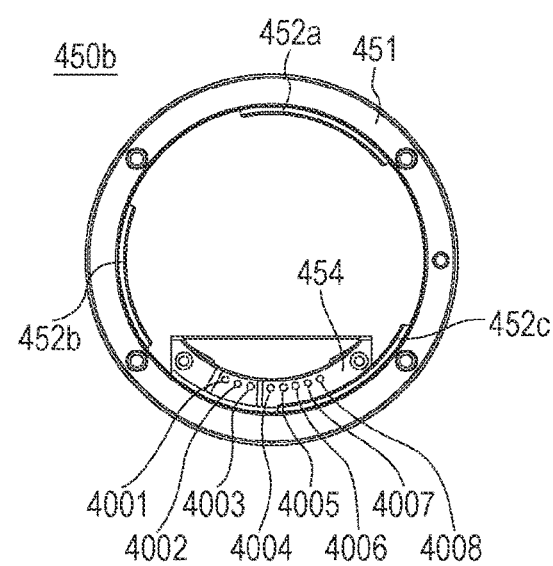
Figure 2D:
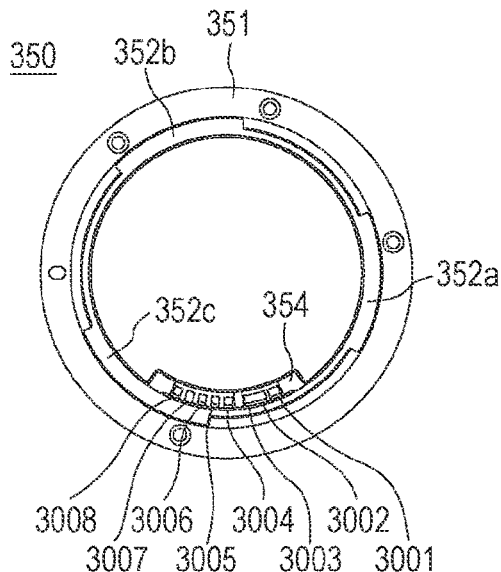

Next, the mount units of the camera body 100, lens apparatus 200, lens apparatus 300, intermediate accessory device 500, and intermediate accessory device 400 will be described with reference to FIGS. 2A through 2D. FIG. 2A is a schematic diagram of the mount unit 150 of the camera body 100 as viewed from the subject side, and FIG. 2B is a schematic diagram of the mount unit 250 of the lens apparatus 200 as viewed from the image plane side. FIG. 2C is a schematic diagram of the mount unit 450b of the intermediate accessory device 400 as viewed from the subject side, and FIG. 2D is a schematic diagram of the mount unit 350 of the lens apparatus 300 as viewed from the image plane side.

The mount unit 150 is provided to the front side (subject side) of the camera body 100. The mount unit 150 has a ring-shaped mount reference face 151 for ensuring a predetermined flange focal distance. Three bayonet claws 152a through 152c are provided on the inner side of the mount reference face 151 in the circumferential direction. A lock pin 153 for positioning when bayonet-coupling the mount unit of an accessory device to the mount unit 150 is provided to the mount unit 150, so as to be retractably protruding with regard to the mount reference face 151. When the mount unit 150 and the mount unit of an accessory device are relatively rotated to a position where mounting is complete, the lock pin 153 engages a fitting hole provided to the mount unit of the accessory device.

A camera-side contact holding member 154 is provided at a region further on the inner side from the bayonet claws 152a through 152c. The camera-side contact holding member 154 holds electric contacts (camera-side electric contacts) 1001 through 1012.

The mount unit 550b of the intermediate accessory device 500 has the same configuration as that of the mount unit 150 illustrated in FIG. 2A.

The mount unit 250 is fixed to the rear end (image plane side) of the lens apparatus 200. The mount unit 250 has a ring-shaped mount reference face 251 that is a reference face for flange focal distance. Three bayonet claws 252a through 252c are provided on the inner side of the mount reference face 251 in the circumferential direction. Further, a fitting face 253 is provided to the mount unit 250. The lock pin 153 fits to the fitting face 253 when mounting of the lens apparatus 200 to the camera body 100 is complete. An accessory-side contact holding member 254 is provided at a region further on the inner side from the bayonet claws 252a through 252c. The accessory-side contact holding member 254 holds electric contacts (lens-side electric contacts) 2001 through 2012.

The mount unit 550a of the intermediate accessory device 500 and the mount unit 450a of the intermediate accessory device 400 have the same configuration as the mount unit 250 illustrated in FIG. 2B. That is to say, the mount unit 550a of the intermediate accessory device 500 and the mount unit 450a of the intermediate accessory device 400 have accessory-side contact holding units that hold electric contacts (accessory side electric contact group) 2001 through 2012.

In the same way as the mount unit 150, the mount unit 450 has a mount reference face 451, bayonet claws 452a through 452c, and a contact holding member 454. Note however, that the length of the bayonet claws 452a through 452c and the intervals between bayonet claws differs from that of the bayonet claws 152a through 152c of the mount unit 150.

In the same way as the mount unit 250, the mount unit 350 has a mount reference face 451, bayonet claws 352a through 352c, and a contact holding member 354. Note however, that the length of the bayonet claws 352a through 352c and the intervals between adjacent bayonet claws differs from that of the bayonet claws 252a through 252c of the mount unit 250.

Figure 3:
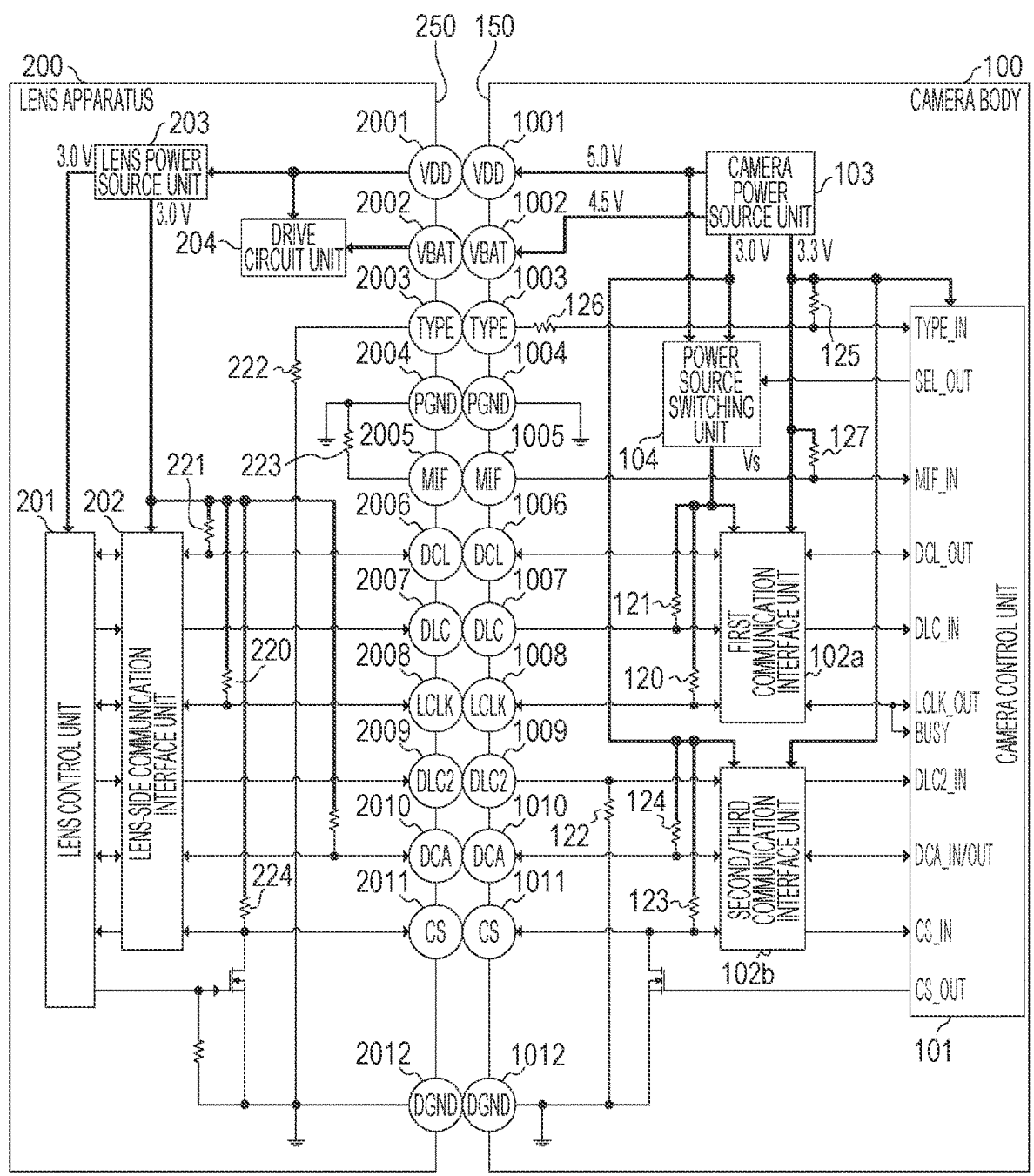
FIG. 3 is a block diagram of an imaging apparatus and lens apparatus according to an embodiment of the present invention.

Next, a case where the lens apparatus 200 is mounted to the camera body 100 will be described with reference to FIG. 3. FIG. 3 is a block diagram illustrating a circuit configuration of a state where the lens apparatus 200 is mounted to the camera body 100. The lens apparatus 200 and the camera body 100 can communicate via a communication path made up by part of the multiple electric contracts provided to the mount unit 150 and mount unit 250. The lens apparatus 200 and the camera body 100 can perform later-described first communication, second communication, and third communication. That is to say, the lens apparatus 200 corresponds to a second lens apparatus.

A camera control unit 101 serving as a camera control unit controls communication performed between an accessory device mounted to the camera body 100, by controlling output of electric contacts provided to the mount unit 150, processing signals input to electric contacts, and so forth.

A camera power source unit 103 is a power source used to operate the parts of the camera body 100 and the accessory device mounted to the camera body 100. The camera power source unit 103 generates multiple different voltages, and supplies power source of these voltages to the parts of the camera body 100 and the accessory device mounted to the camera body 100.

A power source switching unit 104 supplies power source to a first communication interface unit 102a. The power source switching unit 104 is supplied with power source of two different voltage values from the camera power source unit 103, and can switch the power source to be supplied to the first communication interface unit 102a, under control of the camera control unit 101.

A lens control unit 201 serving as a lens control unit controls communication performed between the camera body 100 and the lens apparatus 200, by controlling output of electric contacts provided to the mount unit 250, processing signals input to electric contacts, and so forth.

A lens power source unit 203 generates power source of a predetermined voltage from the power source supplied from the camera body 100, which is supplied to the lens control unit 201 and a lens-side communication interface unit 202.

The electric contact 1001 and the electric contact 2001 are terminals used to supply power, used for control of communication performed primarily between the camera body 100 and lens apparatus 200 (communication power), from the power source unit 103 of the camera body 100 to the lens apparatus 200. Hereinafter, the electric contact 1001 and electric contact 2001 may also be referred to as "VDD terminal 1001" and "VDD terminal 2001". In the present embodiment, the voltage of power supplied to the lens apparatus 200 by the VDD terminal 1001 (hereinafter referred to as "VDD voltage") is 5.0 V.

The electric contact 1002 and the electric contact 2002 are terminals used to supply power, used primarily for operations of driving systems such as motors and the like (drive power), from the camera body 100 to the lens apparatus 200. Hereinafter, the electric contact 1002 and electric contact 2002 may also be referred to as "VBAT terminal 1002" and "VBAT terminal 2002". In the present embodiment, the voltage of power supplied to the lens apparatus 200 by the VBAT terminal 1002 (hereinafter referred to as "VBAT voltage") is 4.5 V. The VDD terminals and VBAT terminals may also be collectively referred to as "power source system terminals".

The electric contact 1012 and the electric contact 2012 are terminals that ground communication control system circuits of the camera main body 100 and lens apparatus 200. That is to say, these are ground terminals corresponding to the VDD terminals. Hereinafter, the electric contact 1012 and electric contact 2012 may also be referred to as "DGND terminal 1012" and "DGND terminal 2012".

The electric contact 1004 and the electric contact 2004 are terminals that ground drive system circuits including motors and so forth, provided to the camera main body 100 and lens apparatus 200. That is to say, these are ground terminals corresponding to the VBAT terminals. Hereinafter, the electric contact 1004 and electric contact 2004 may also be referred to as "PGND terminal 1004" and "PGND terminal 2004". The DGND terminals and PGND terminals may also be collectively referred to as "ground terminals".

The electric terminal 1005 and the electric terminal 2005 are terminals for detecting that a lens apparatus has been mounted to the camera body 100. The camera control unit 101 detects mounting and detaching of a lens apparatus to and from the camera body 100 in accordance with the voltage level of the electric contact 1005. When the camera control unit 101 detects mounting of a lens apparatus, supply of power source to the lens apparatus via the VDD terminal 1001 and VBAT terminal 1002 is started. Hereinafter, the electric terminal 1005 and electric terminal 2005 may be also referred to as "MIF terminal 1005" and "MIF terminal 2005".

The electric contact 1003 and the electric contact 2003 are terminals for distinguishing the type of accessory device mounted to the camera body 100. The electric contact 1003 is pulled up to the same voltage as the power source supplied to the camera control unit 101 within the camera body 100, by a resistor 125. The electric contact 2003 is pulled down to ground (DGND) via a resistor 222 within the lens apparatus 200. The camera control unit 101 detects the voltage value at the electric contact 1003, and distinguishes the type of accessory device mounted to the camera body 100 based on the detected voltage value. That is to say, the camera control unit 101 also functions as a distinguishing unit that distinguishes the type of accessory device mounted to the camera control unit 101. The camera control unit 101 also controls the power source switching unit 104 so that the power source supplied to the first communication interface unit 102a by the power source switching unit 104 is switched in accordance with the type of accessory device mounted to the camera body 100. Accordingly, the camera body 100 and the accessory device mounted to the camera body 100 can communicate at an appropriate communication voltage. Hereinafter, the electric contact 1003 and electric contact 2003 may also be referred to as "TYPE terminal 1003" and "TYPE terminal 2003".

The electric contacts 1006 through 1008 and the electric contacts 2006 through 2008 are terminals used for later-described first communication. The input/output of the electric contacts 1006 through 1008 is controlled by the camera control unit 101 via the first communication interface unit 102a. The input/output of the electric contacts 2006 through 2008 is controlled by the lens control unit 201 via the lens-side communication interface unit 202.

The electric contact 1008 (first camera-side electric contact, also referred to as "first electric contact") and the electric contact 2008 (first lens-side electric contact, also referred to as "fifth electric contact") are terminals capable of output clock signals used for the first communication from the camera body 100 to the lens apparatus 200. The electric contact 1008 and electric contact 2008 are also used for the lens apparatus 200 to notify the camera body 100 of a communication standby request. Hereinafter, the electric contact 1008 and electric contact 2008 may also be referred to as "LCLK terminal 1008" and "LCLK terminal 2008". The LCLK terminal 1008 is pulled up to the same potential as the interface voltage of the first communication interface unit 102a via a resistor 120 within the camera body 100. The LCLK terminal 2008 is pulled up to the same potential as the interface voltage of the lens-side communication interface unit 202 via a resistor 220 within the lens apparatus 200.

The electric contact 1006 (second camera-side electric contact, also referred to as "second electric contact") and the electric contact 2006 (second lens-side electric contact, also referred to as "sixth electric contact") are terminals capable of transmitting data from the camera body 100 to the lens apparatus 200 by the first communication. Hereinafter, the electric contact 1006 and electric contact 2006 may also be referred to as "DCL terminal 1006" and "DCL terminal 2006". The DCL terminal 2006 is pulled up to the same potential as the interface voltage of the lens-side communication interface unit 202 via a resistor 221 within the lens apparatus 200.

The electric contact 1007 (third camera-side electric contact, also referred to as "third electric contact") and the electric contact 2007 (third lens-side electric contact, also referred to as "seventh electric contact") are terminals capable of transmitting data from the lens apparatus 200 to the camera body 100 by the first communication. Hereinafter, the electric contact 1007 and electric contact 2007 may also be referred to as "DLC terminal 1007" and "DLC terminal 2007". The DLC terminal 1007 is pulled up to the same potential as the interface voltage of the first communication interface unit 102a via a resistor 121 within the camera body 100.

Hereinafter, the LCLK terminal 1008, DCL terminal 1006, and DLC terminal 1007, used in the first communication, may also be referred to as "first camera-side electric contact group" or "first electric contact group". Also, the LCLK terminal 2008, DCL terminal 2006, and DLC terminal 2007, used in the first communication, may also be referred to as "first lens-side electric contact group" or "third electric contact group". DLC2 terminal 1009, DCA terminal 1010, and CS terminal 1011, which are electric contacts used for communication that differs from the first communication i.e., second communication and third communication, may also be referred to as "second camera-side electric contact group" or "second electric contact group".

The electric contact 1009 (fourth camera-side electric contact, also referred to as "fourth electric contact") and electric contact 2009 are used in later-described second communication. The electric contact 1009 and electric contact 2009 are terminals capable of transmitting data from the lens apparatus 200 to the camera body 100 by the second communication. Hereinafter, the electric contact 1009 and electric contact 2009 may also be referred to as "DLC2 terminal 1009" and "DLC2 terminal 2009". The DLC2 terminal 1009 is pulled down to the same potential as the DGND terminal via a resistor 122 within the camera body 100.

The electric contacts 1010 and 1011, and the electric contacts 2010 and 2011, are terminal used in later-described third communication. The electric contact 1010 and the electric contact 2010 are terminals capable of bi-directionally exchanging data between the camera body 100 and lens apparatus 200 by the third communication. Hereinafter, the electric contact 1010 and electric contact 2010 may also be referred to as "DCA terminal 1010" and "DCA terminal 2010". The DCA terminal 1010 is pulled up to the same potential as the interface voltage as the second/third communication interface unit 102b via a resistor 124 within the camera body 100. The DCA terminal 1010 is connected to the camera control unit 101 via a CMOS-type input/output interface. In the same way, the DCA2 terminal 2010 is connected to the lens control unit 201 via a CMOS-type input/output interface. Accordingly, the camera control unit 101 and the lens control unit 201 can exchange data at high speeds, using the DCA terminals 1010 and 2010.

The electric contact 1011 and the electric contact 2011 are terminals used in notification of a later-described predetermined timing relating to third communication between the camera body 100 and lens apparatus 200. Hereinafter, the electric contact 1011 and electric contact 2011 may also be referred to as "CS terminal 1011" and "CS terminal 2011". The CS terminal 1011 is pulled up to the same potential as the interface voltage of the second/third communication interface unit 102b via a resistor 123 within the camera body 100. Also, the CS terminal 2011 is pulled up to the same potential as the interface voltage of the lens-side communication interface unit 202 via a resistor 224 within the lens apparatus 200. The CS terminal 1011 is connected to the camera control unit 101 via an open-type output interface. In the same way, the CS terminal 2011 is connected to the lens control unit 201 via an open-type output interface. Note that the term "open-type output interface" here means an output interface that is an open drain or an open collector.

In a case where the lens apparatus 200 is mounted to the camera body 100 in the present embodiment, the interface voltages of the first communication interface unit 102a and second/third communication interface unit 102b are set to 3.0 V (first voltage). The interface voltage of the lens-side communication interface unit 202 is also set to 3.0 V (first voltage). Note that hereinafter, the LCLK terminals, DCL terminal, DLC terminals, DCL2 terminals, CS terminals and DCA terminals, may be collectively referred to as "communication system terminals".

Figure 4A:
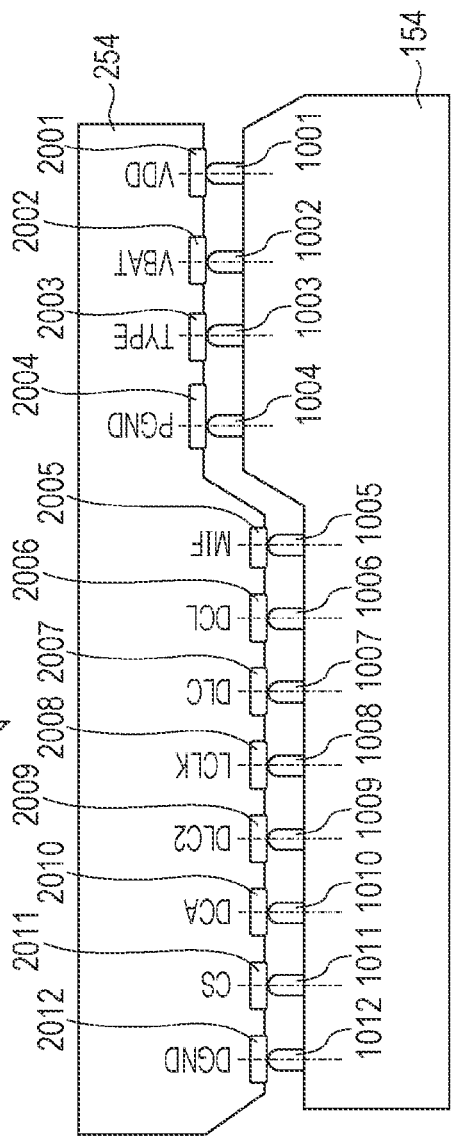
FIGS. 4A and 4B are schematic diagrams of a camera-side contact holding member and an accessory-side contact holding member.
Figure 4B:
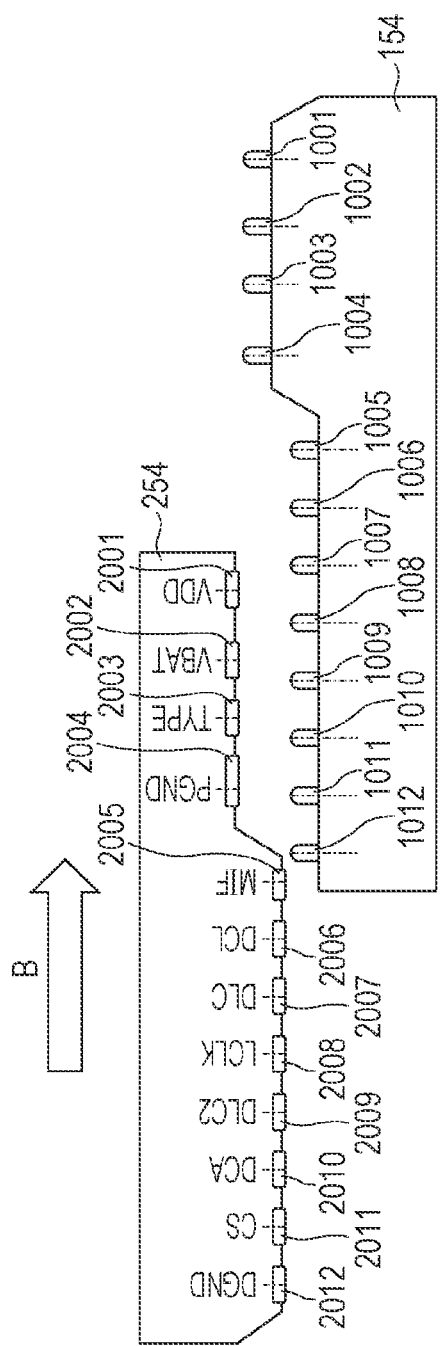

Next, the shapes of the camera-side contact holding member 154 and the accessory-side contact holding member 254 of the mount unit 150 and mount unit 250 will be described with reference to FIGS. 4A and 4B. FIG. 4A is a schematic diagram viewing the camera-side contact holding member 154 and accessory-side contact holding member 254 from a direction perpendicular to the optical axis, in a state where the lens apparatus 200 is mounted to the camera body 100. FIG. 4B is a schematic diagram viewing the camera-side contact holding member 154 and accessory-side contact holding member 254 from a direction perpendicular to the optical axis, in a state where the lens apparatus 200 is not completely mounted to the camera body 100. FIGS. 4A and 4B illustrate the camera-side contact holding member 154 and accessory-side contact holding member 254 in planar view. However, in reality, the shapes of the camera-side contact holding member 154 and accessory-side contact holding member 254 are curved following the circumferential direction of the mount unit 150 and mount unit 250. Although the electric contacts of the camera body 100 are illustrated in FIGS. 4A and 4B as being pins and the electric contacts of the lens apparatus 200 as being contact pieces, an arrangement may be made where the electric contacts of the camera body 100 are contact pieces and the electric contacts of the lens apparatus 200 are pins.

Arrow A illustrated in FIG. 4A indicates the direction in which the lens apparatus 200 moves as to the camera body 100 (rotation direction) when detaching the lens apparatus 200 from the camera body 100. When detaching the lens apparatus 200, the VDD terminal 2001 for example comes into contact with the TYPE terminal 1003 after having come into contact with the VBAT terminal 1002.

Also, arrow B illustrated in FIG. 4B indicates the direction in which the lens apparatus 200 moves as to the camera body 100 (rotation direction) when mounting the lens apparatus 200 to the camera body 100. The direction of arrow B corresponds to a first direction. When mounting the lens apparatus 200, the VDD terminal 2001 for example is connected to the VDD terminal 1001 after having come into contact with the VBAT terminal 1002.

Also, the camera-side contact holding member 154 and the accessory-side contact holding member 254 have shapes that are stepped in the optical axis direction, as illustrated in FIGS. 4A and 4B. The electric contacts 1001 through 1004 and the electric contacts 1005 through 1012 are provided on different tiers (or steps). In the same way, the electric contacts 2001 through 2004 and the electric contacts 2005 through 2012 are provided on different tiers (or steps). Accordingly, the electric contacts 2001 through 2004 can be kept from coming into contact with the electric contacts 1005 through 1012 when mounting the lens apparatus 200 to the camera body 100. Accordingly, the amount of wear of the electric contacts when mounting/detaching the lens apparatus 200 to/from the camera body 100 can be reduced.

Further, the camera body 100 according to the present embodiment has power source system terminals on the tier that has fewer electric contacts. In the same way, the lens apparatus 200 according to the present embodiment has power source system terminals on the tier that has fewer electric contacts. Accordingly, the amount of wear of the power source system terminals when mounting/detaching the lens apparatus 200 to/from the camera body 100 can be further reduced, and increase in contact impedance can be suppressed. As a result, stable power source supply can be performed over a long time. Further note that the ground terminals also are preferably provided on the tier that has fewer electric contacts for stable power supply.

On the other hand, the DGND terminal 1012 and DGND terminal 2012 are preferably brought into contact with a metal portion of the mount unit 150 and mount unit 250, in order to reduce the influence of static electricity on the internal circuits. In this case, the DGND terminal 1012 is preferably situated at the end of the array of electric contacts 1001 through 1012, in order to facilitate forming of the mount unit 150. In the same way, the DGND terminal 2012 is preferably situated at the end of the array of electric contacts 2001 through 2012, in order to facilitate forming of the mount unit 250.

In light of this, the PGND terminal 1004 is provided on the tier that holds fewer electric contacts, and the DGND terminal 1012 is provided at the end of the array of electric contacts 1001 through 1012 in the present embodiment. In the same way, the PGND terminal 2004 is provided on the tier that holds fewer electric contacts, and the DGND terminal 2012 is provided at the end of the array of electric contacts 2001 through 2012.

Next, the order of the array of the electric contacts on the camera-side contact holding member 154 and accessory-side contact holding member 254 will be described. In the present embodiment, the PGND terminal 1004, TYPE terminal 1003, VBAT terminal 1002, and VDD terminal 1001 are disposed on the tier of the camera-side contact holding member 154 that holds fewer electric contacts, in order of the mounting direction of the lens apparatus 200 (direction of arrow B in FIG. 4B). In the same way, the PGND terminal 2004, TYPE terminal 2003, VBAT terminal 2002, and VDD terminal 2001 are disposed on the tier of the accessory-side contact holding member 254 that holds fewer electric contacts, in order of the mounting direction of the lens apparatus 200 (direction of arrow B in FIG. 4B).

If an electroconductive foreign substance is caught between the camera-side contact holding member 154 and accessory-side contact holding member 254, or an electric contact is deformed, adjacent electric contacts may short-circuit each other. Particularly, in a case where the power source system terminals (VDD terminals and VBAT terminals) short-circuit with the ground terminals (PGND terminals), a large electric current will flow to the power source circuit. To counter this, the influence of short-circuiting on the power source circuit can be reduced by providing different electric contacts between the power source system terminals and ground terminals.

Note that the terminals provided between the power source system terminals and ground terminals preferably are terminals that have a generally constant signal level during operations of the camera body 100 and lens apparatus 200. Normally, a protective element, for protecting internal circuits of the camera body 100 when short-circuiting occurs, is provided between the terminals adjacent to the power source system terminals and the camera control unit 101. In a case where terminals of which the signal level changes during operations of the camera body 100 and lens apparatus 200, such as communication system terminals, are provided between the power source system terminals and ground terminals, the wiring capacitance of these terminals will increase due to the protective element. Accordingly, the signal waveforms transmitted or received through these terminals can be affected. On the other hand, terminals that have a generally constant signal level during operations of the camera body 100 and lens apparatus 200 will be affected less by providing the protective element. The TYPE terminals and MIF terminals are terminals that have a generally constant signal level during operations, but the MIF terminals are preferably provided to the tier where there are more electric contacts, which will be described later, so the TYPE terminals are preferably provided between the power source system terminals and ground terminals. Note that a resistor 126 is disposed between the TYPE terminal 1003 and the camera control unit 101 as the protective element in the present embodiment.

The MIF terminal 1005 is disposed on the tier of the camera-side contact holding member 154 that has a greater number of electric contacts, at a position that is closest to the tier with fewer electric contacts, in the present embodiment. In a corresponding manner, the MIF terminal 2005 is disposed on the tier of the accessory-side contact holding member 254 that has a greater number of electric contacts, at a position that is closest to the tier with fewer electric contacts.

Disposing the MIF terminal 1005 at this position enables the MIF terminal 2005 to be the only electric contact coming into contact with the MIF terminal 1005 when attaching/detaching the lens apparatus 200 to/from the camera body 100. Accordingly, the wear on the MIF terminal 1005 can be reduced. This makes defective contact of the MIF terminal 1005 less readily to occur, and whether the lens apparatus is mounted can be appropriately detected.

Note that when attaching/detaching the lens apparatus 200 to/from the camera body 100, the MIF terminal 2005 comes into contact with the electric contacts 1006 through 1012, so it can be said that the MIF terminal 2005 is disposed at a position where the amount of wear due to sliding is great. However, multiple types of camera accessories are mounted to the camera body 100, as illustrated in FIG. 1, and so the amount of wear of the electric contacts on the lens apparatus 200 is small as compared to that of the camera body 100. Accordingly, the electric contacts are arrayed in the present embodiment so that the amount of wear of the MIF terminal 1005 of the camera body 100 is small.

Further, if the MIF terminal 1005 comes into contact with other electric contacts when mounting the lens apparatus 200 to the camera body 100, the voltage level of the MIF terminal 1005 may change and the camera control unit 101 may falsely detect mounting of the lens apparatus. If there is false detection of the lens apparatus 200 before mounting of the lens apparatus 200 is complete, power source supply by the power source system terminals may be started, which can lead to malfunctioning of the lens apparatus 200 and affect internal circuits of the lens apparatus 200. Conversely, disposing the MIF terminal 1005 as in the present embodiment enables starting of power source supply before the MIF terminals are connected to each other (before completion of mounting of the lens apparatus 200) to be suppressed.

Note that the length of the MIF terminal 2005 of the lens apparatus 200 in the circumferential direction of the mount unit 250 preferably is shorter than that of the other electric contacts. Accordingly, when mounting the lens apparatus 200 to the camera body 100, the MIF terminal 2005 can be made to be connected last of the multiple electric contacts. In this case, power source supply from the camera body 100 to the lens apparatus 200 can be performed after connection of the other electric contacts has been completed. Also, when detaching the lens apparatus 200 from the camera body 100, the MIF terminal 2005 can be disengaged first out of the multiple electric contacts. In this case, supply of power source from the camera body 100 to the lens apparatus 200 can be immediately stopped when detaching the lens apparatus 200 from the camera body 100. Note that it is sufficient for the length of the MIF terminal 2005 in the circumferential direction of the mount unit 250 to be shorter than the other electric contacts by an amount equivalent of 1 degree center angle.

The order of the array of the communication system terminals in the present embodiment is appropriately decided, taking into consideration the roles of the terminals. Specifically, the CS terminal 1011 is disposed adjacent to the DGND terminal 1012, and the DCA terminal 1010 is disposed on the other side of the CS terminal 1011 from the DGND terminal 1012. In the same way, the CS terminal 2011 is disposed adjacent to the DGND terminal 2012, and the DCA terminal 2010 is disposed on the other side of the CS terminal 2011 from the DGND terminal 2012. Accordingly, electrical influence on the camera body 100 and lens apparatus 200 from unintentional connection among electric contacts with each other is reduced, while increasing the communication speed of the third communication, which will be described later.

Also, the DLC2 terminal 1009 used for second communication is provided between the DCA terminal 1010 and the LCLK terminal 1008. In the same way, the DLC2 terminal 2009 used for second communication is provided between the DCA terminal 2010 and the LCLK terminal 2008. Accordingly, electrical influence on the camera body 100 and lens apparatus 200 from unintentional connection among electric contacts with each other is reduced, which will be described later.

Further, the CS terminal 1011, DCA terminal 1010, DLC2 terminal 1009, and the first camera-side electric contact group, are disposed in this order in the first direction (direction of arrow B) on the camera-side contact holding member 154. That is to say, the amount of sliding that the electric contacts in the first camera-side electric contact group experience due to attaching/detaching of the accessory device is smaller than that at any of the CS terminal 1011, DCA terminal 1010, and DLC2 terminal 1009. Accordingly, defective communication due to wear of the electric contacts is reduced, which will be described later.

Next, a case of mounting the lens apparatus 200 to the camera body 100 via the intermediate accessory device 500 will be described with reference to FIGS. 5A and 5B. The intermediate accessory device 500 can perform third communication with the camera body 100.

Figure 5A:
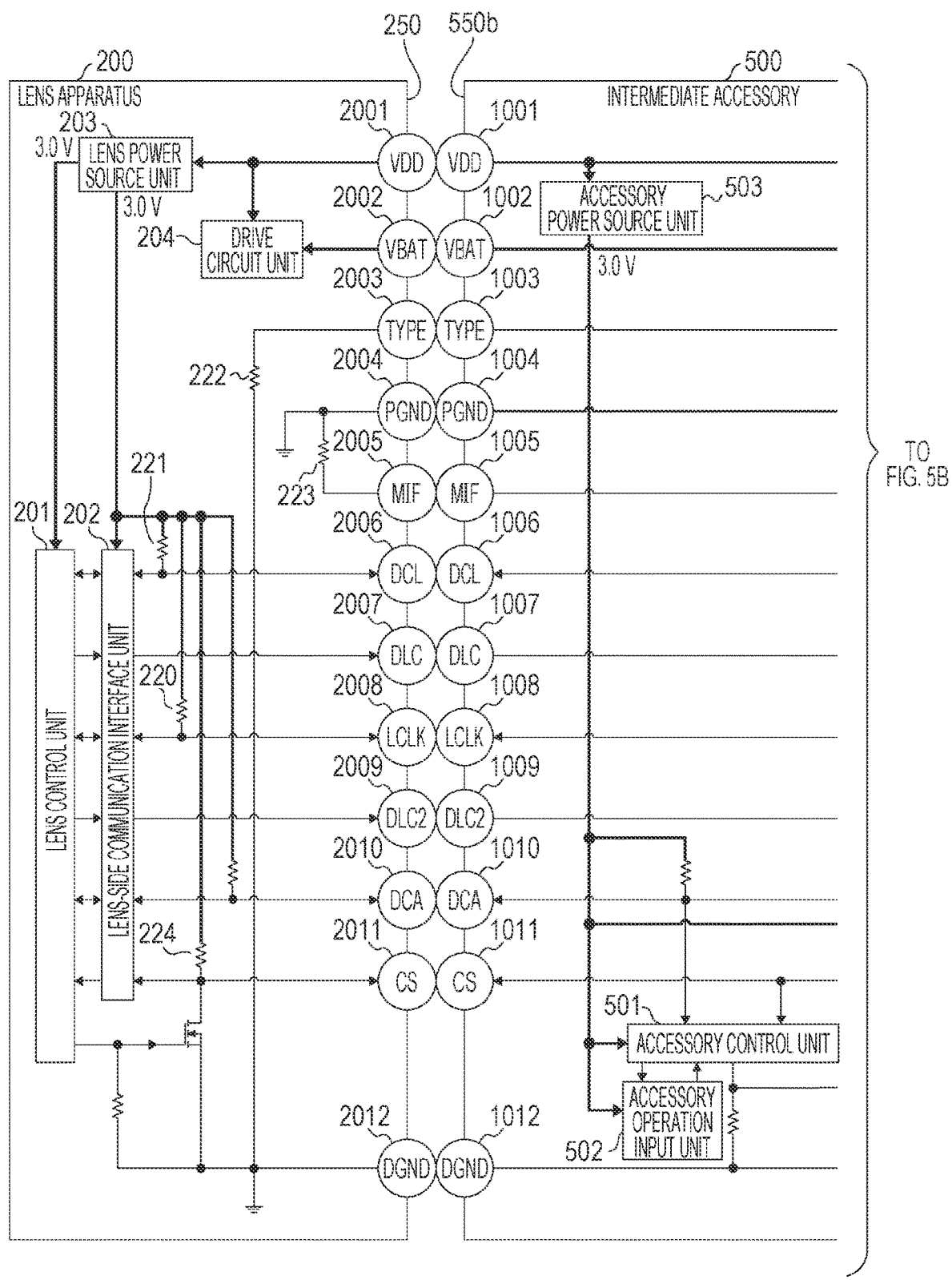
FIGS. 5A and 5B are block diagrams of an imaging apparatus, lens apparatus, and intermediate accessory device according to an embodiment of the present invention.
Figure 5B:
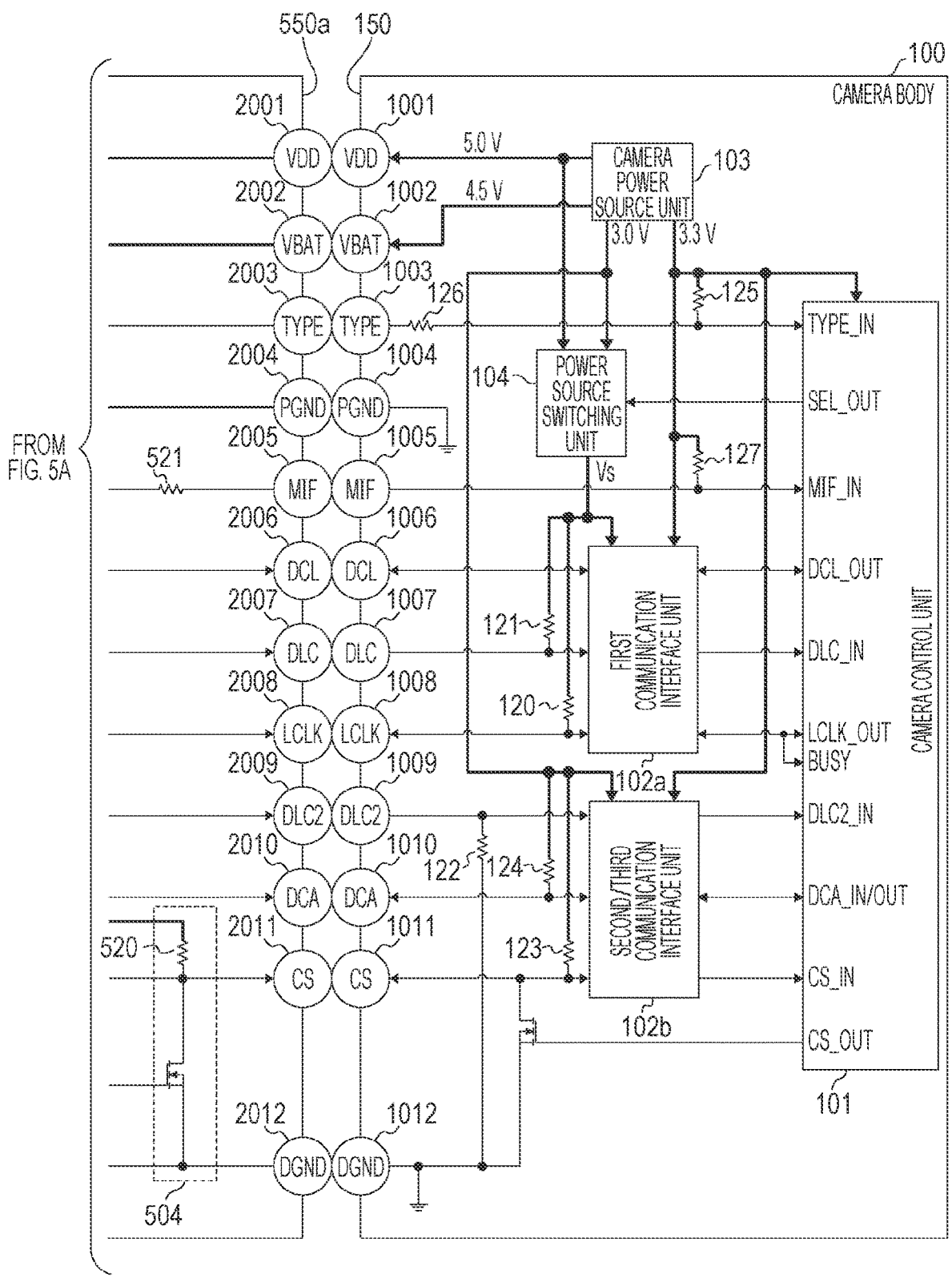

FIGS. 5A and 5B are block diagrams illustrating a case of the lens apparatus 200 being mounted to the camera body 100 via the intermediate accessory device 500. The intermediate accessory device 500 has the mount unit 550a and mount unit 550b, as described earlier. The intermediate accessory device 500 also has an accessory control unit 501 that controls communication with the camera body 100 and performs processing in accordance with operation of an operating member (omitted from illustration) provided to the intermediate accessory device 500. Operation of the operating member is communicated to the accessory control unit 501 via an adapter operation input unit 502. An example of an operating member is a function ring by which the aperture value can be set.

The mount unit 550a is the same as the above-described mount unit 250 of the lens apparatus 200. Accordingly, in a state where the intermediate accessory device 500 has been mounted to the camera body 100, the electric contacts 2001 through 2012 provided to the mount unit 550a are in contact with the electric contacts 1001 through 1012 provided to the camera body 100. The mount unit 550b also is the same as the above-described mount unit 150 of the camera body 100. Accordingly, in a state where the lens apparatus 200 is mounted to the intermediate accessory device 500, the electric contacts 1001 through 1012 provided to the mount unit 550b come into contact with the electric contacts 2001 through 2012 provided to the lens apparatus 200. The electric contacts 2001 through 2012 provided to the mount unit 550a are connected to the electric contacts 1001 through 1012 provided to the mount unit 550b by wiring within the intermediate accessory device 500.

Note that in the intermediate accessory device 500, the VDD terminal 2001 is also connected to an accessory power supply unit 503, and is configured so as to supply electric power to the intermediate accessory device 500 as well. In the present embodiment, the accessory power supply unit 503 generates power source of 3.0 V, and supplies to the accessory control unit 501 and adapter operation input unit 502. The DCA terminal 2010 and CS terminal 2011 used for the third communication within the intermediate accessory device 500 are also connected to the accessory control unit 501, so the intermediate accessory device 500 and camera body 100 can perform the third communication.

In a case where the lens apparatus 200 is mounted to the camera body 100 via the intermediate accessory device 500, the interface voltage of the first communication interface unit 102a and second/third communication interface unit 102b is set to 3.0 V. The interface voltage of the lens-side communication interface unit 202 also is set to 3.0 V. This so far has been a description of a case where the lens apparatus 200 is mounted to the camera body 100.

Next, a case of mounting the lens apparatus 300 to the camera body 100 will be described with reference to FIGS. 6A and 6B. The lens apparatus 300 is a lens apparatus according to a conventional arrangement, as mentioned earlier, and differs from the lens apparatus 200 according to the present embodiment. The lens apparatus 300 cannot perform the second communication or the third communication with the camera body, but can perform the first communication. That is to say, the lens apparatus 300 corresponds to a first lens apparatus. The intermediate accessory device 400 can perform the third communication with the camera body.

Figure 6A:
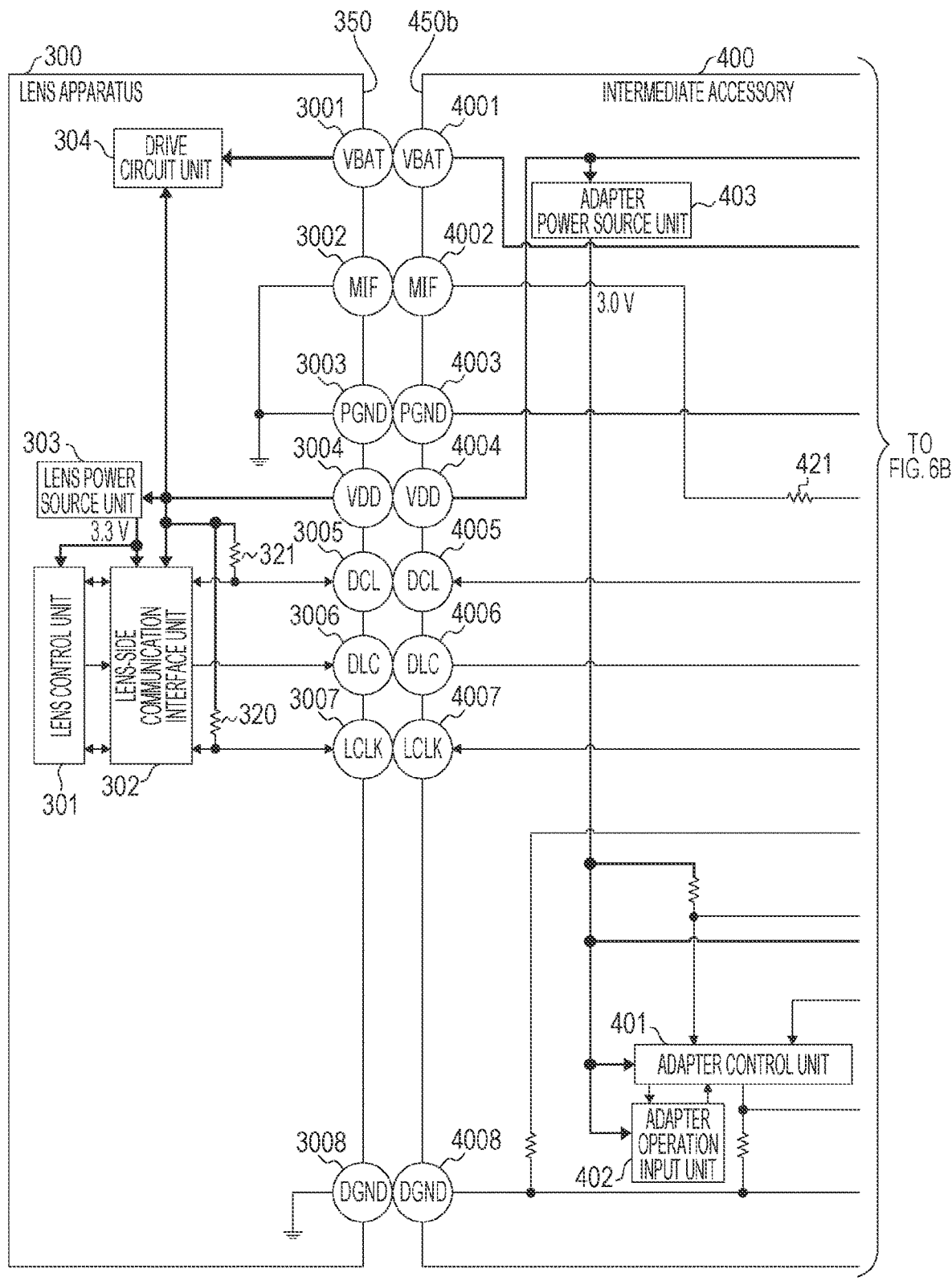
FIGS. 6A and 6B are block diagrams of the imaging apparatus and intermediate accessory device according to an embodiment of the present invention, and a lens apparatus according to a conventional arrangement.
Figure 6B:
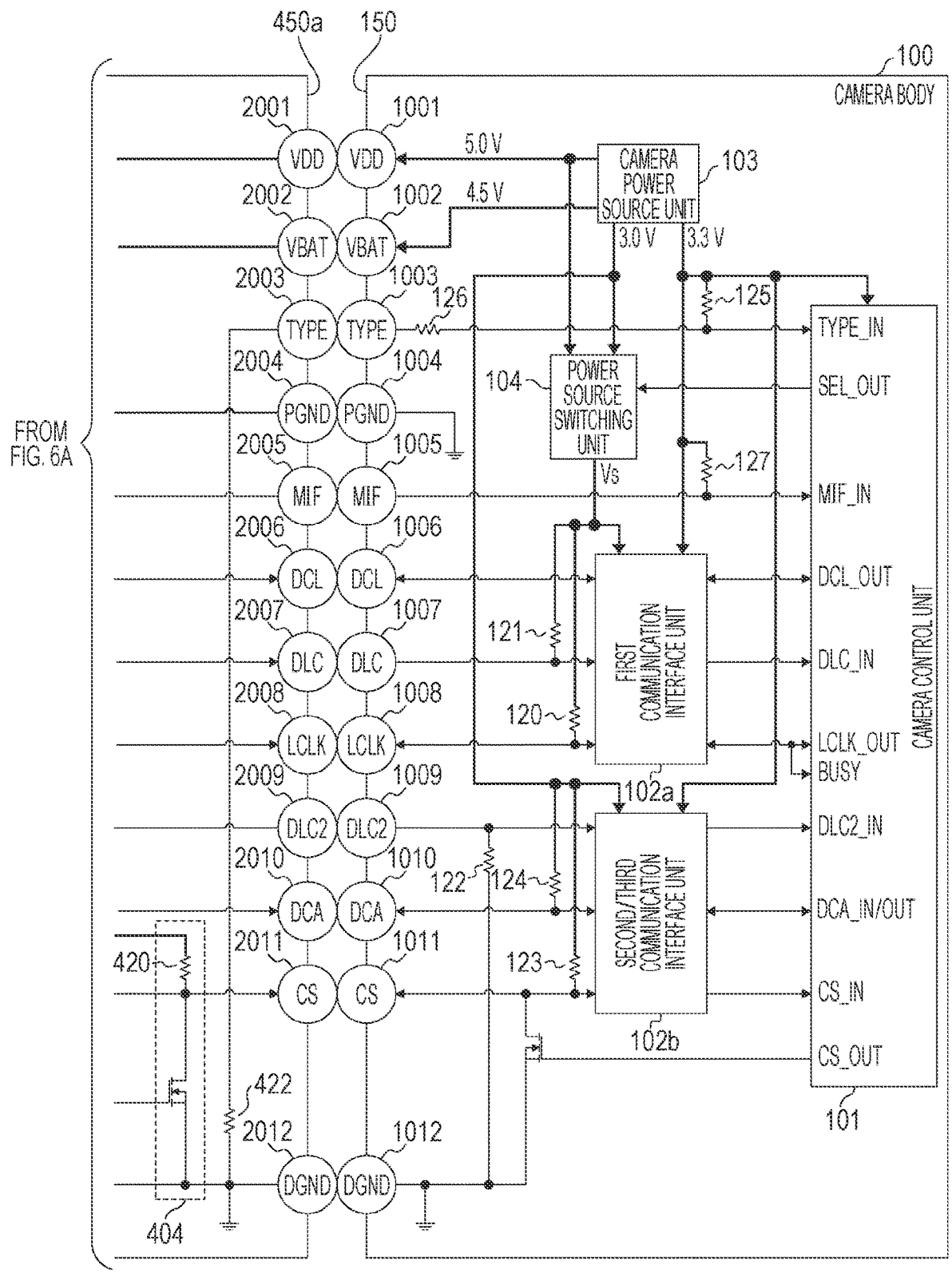

FIGS. 6A and 6B are block diagrams illustrating a case of the lens apparatus 300 being mounted to the camera body 100 via the intermediate accessory device 400. As described above, the intermediate accessory device 400 has the mount units 450a and 450b. The intermediate accessory device 400 also has an adapter control unit 401 that performs processing communication with the camera body 100, and processing in accordance with operations made at an operating member omitted from illustration. Operations at the operating member are notified to the adapter control unit 401 via an adapter operation input unit 402.

The mount unit 450a is the same as the mount unit 250 of the lens apparatus 200. Note however, that the internal circuits of the intermediate accessory device 400 and the internal circuits of the lens apparatus 200 are different. Specifically, the DCL terminal 2006, DLC terminal 2007, and LCLK terminal 2008, used for the first communication, are not connected to the adapter control unit 401 within the intermediate accessory device 400, and are connected to the corresponding electric contacts of the mount unit 450b by through wiring. On the other hand, the DCA terminal 2010 and CS terminal 2011 used for the third communication are connected to the adapter control unit 401 within the intermediate accessory device 400. This is in order to perform the third communication between the intermediate accessory device 400 and camera body 100, and not perform the first communication.

The DLC2 terminal 2009 used for the second communication is pulled down to the same level as the DGND terminal 2012 via resistance within the intermediate accessory device 400. This is because the lens apparatus 300 and camera body 100 do not perform the second communication.

The TYPE terminal 2003 also is pulled down to the same level as the DGND terminal 2012 by a resistor 422 within the intermediate accessory device 400. The resistor 422 has a resistance value that is different from that of the resistor 222 of the lens apparatus 200.

Next the electric contacts provided to the mount unit 450b and the mount unit 350 will be described. An electric contact 3001 and an electric contact 4001 are terminals used to supply driving power from the VBAT terminal 1002 of the camera body 100 to the lens apparatus 300. The VBAT terminal 2002 is connected to the electric contact 4001 by through wiring within the intermediate accessory device 400. Hereinafter, the electric contact 3001 and electric contact 4001 may also be referred to as "VBAT terminal 3001" and "VBAT terminal 4001". Note that in the present embodiment, the voltage of power supplied to the lens apparatus 300 by the VBAT terminal 1002 is 4.5 V.

An electric contact 3004 and an electric contact 4004 are terminals used to supply communication power from the VDD terminal 1001 of the camera body 100 to the lens apparatus 300. The VDD terminal 2001 is connected to the electric contact 4001 by through wiring within the intermediate accessory device 400, and also is connected to an adapter power source 403 within the intermediate accessory device 400. The adapter power source 403 generates a power source of 3.0 V as a power source to supply to the adapter control unit 401 and the adapter operation input unit. Hereinafter, the electric contact 3004 and electric contact 4004 may also be referred to as "VDD terminal 3004" and "VDD terminal 4004". Note that in the present embodiment, the voltage of power supplied to the lens apparatus 200 by the VDD terminal 1001 is 5.0 V.

An electric contact 3003 and an electric contact 4003 are terminals used to ground the driving systems of the camera body 100 and lens apparatus 300. That is to say, these are ground terminals corresponding to the VBAT terminals. The PGND terminal 2004 is connected to the electric contact 4003 by through wiring within the intermediate accessory device 400. Hereinafter, the electric contact 3003 and electric contact 4003 may also be referred to as "PGND terminal 3003" and "PGND terminal 4003".

An electric contact 3008 and an electric contact 4008 are terminals used to ground the communication systems of the camera body 100 and lens apparatus 300. That is to say, these are ground terminals corresponding to the VDD terminals. The VDD terminal 2012 is connected to the electric contact 4008 by through wiring within the intermediate accessory device 400. Hereinafter, the electric contact 3008 and electric contact 4008 may also be referred to as "DGND terminal 3008" and "DGND terminal 4008".

An electric contact 3002 and an electric contact 4002 are terminals used to detect that the lens apparatus 300 has been mounted to the camera body 100 via the intermediate accessory device 400. Upon detecting that the lens apparatus 300 has been mounted, the camera control unit 101 starts supplying power source to the lens apparatus 300. The MIF terminal 2005 is connected to the electric contact 4002 by through wiring in the intermediate accessory device 400. Hereinafter, the electric contact 3002 and electric contact 4002 may also be referred to as MIF terminal 3002 and MIF terminal 4002.

Electric contacts 3005 through 3007 and electric contacts 4005 through 4007 are terminals used for the later-described first communication. The input/output of the electric contacts 3005 through 3007 is controlled by a lens control unit 301 via a lens-side communication interface unit 302. Hereinafter, the electric contacts 3005, 3006, and 3007 may also be referred to as DCL terminal 3005, DLC terminal 3006, and LCLK terminal 3007. The electric contacts 4005, 4006, and 4007 may also be referred to as DCL terminal 4005, DLC terminal 4006, and LCLK terminal 4007.

In a case where the lens apparatus 300 is mounted via the intermediate accessory device 400, the interface voltages of the first communication interface unit 102a and the lens-side communication interface unit 302 are set to 5.0 V (second voltage) that is the same as the voltage supplied from the VDD terminals. The second voltage is a voltage that is different from the first voltage.

On the other hand, the interface voltage of the second/third communication interface unit 102b is set to 3.0 V. That is to say, in a case where the lens apparatus 300 is mounted to the camera body 100 via the intermediate accessory device 400, the communication voltage of the first communication and the communication voltage of the third communication are different from each other. In a case where the lens apparatus 300 is mounted to the camera body 100 via the intermediate accessory device 400, the second communication is not performed, which will be described later.

This so far has been a description of the configuration of the camera body 100 and of accessory devices that can be mounted to the camera body 100. Next, the function of the TYPE terminal 1003 will be described in detail.

An assumption will be made in the following description that the power source voltage the TYPE terminal 1003 is pulled up to within the camera body 100 is 3.3 V. Assumption will also be made that the resistance value of the resistor 125 is 100 kΩ, the resistance value of the resistor 126 is 1 kΩ, the resistance value of the resistor 222 is 33 kΩ, and the resistance value of the resistor 422 is 300 kΩ. The voltage value input to a TYPE_IN terminal is converted into digital signals of 10-bit resolution by an AD converter that is omitted from illustration.

Figure 7A:
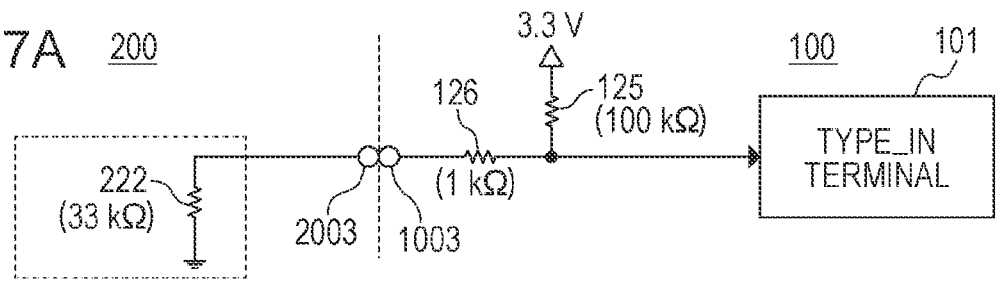
FIGS. 7A through 7E are schematic diagrams of peripheral circuits of a TYPE terminal.

FIG. 7A is an illustration of peripheral circuits of the TYPE terminal 1003 in a state where the lens apparatus 200 is mounted to the camera body 100. In this case, the value input to the TYPE_IN terminal of the camera control unit 101 is a value where the power source voltage (3.3 V) has been divided by the resistor 125 and resistor 222 and A-to-D converted, and is approximately "0x0103".

Figure 7B:
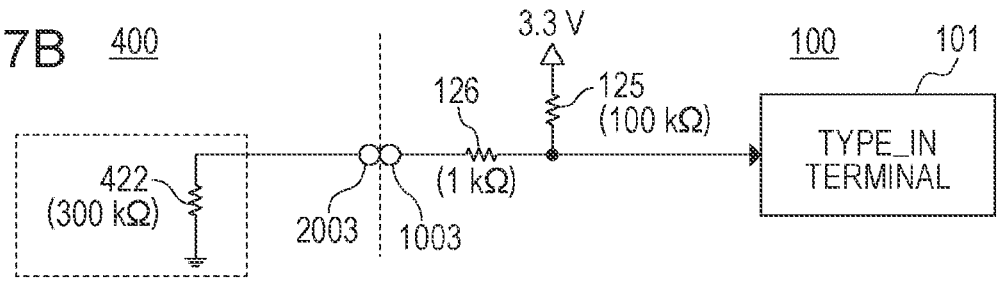

Also, FIG. 7B is an illustration of peripheral circuits of the TYPE terminal 1003 in a state where the lens apparatus 300 is mounted to the camera body 100 via the intermediate accessory device 400. In this case, the value input to the TYPE_IN terminal of the camera control unit 101 is a value where the power source voltage (3.3 V) has been divided by the resistor 125 and resistor 422 and A-to-D converted, and is approximately "0x0300".

Thus, the value input to the TYPE_IN terminal can be made to differ in accordance with the type of accessory device mounted to the camera body 100, by differing the resistance values of the resistor 422 of the intermediate accessory device 400 and the resistance value of the resistor 222 of the lens apparatus 200. Accordingly, the camera control unit 101 can distinguish the type of accessory device mounted to the camera body 100 using the value input to the TYPE_IN terminal.

However, in a case where there is some sort of abnormality that has occurred with regard to the connection state of the TYPE terminal 1003 and the TYPE terminals 2003, an unanticipated value may be input to the TYPE_IN terminal. If the camera control unit 101 determines that there is some sort of accessory device mounted to the camera body 100 regardless of some sort of abnormality occurring in the mounting state of the accessory device, nonrated voltage may be applied to the accessory device, which should be avoided. Accordingly, a case where some sort of abnormality occurs with regard to the connection state of the TYPE terminal 1003 and the TYPE terminals 2003 will be considered with reference to FIGS. 7C through 7E.

Figure 7C:
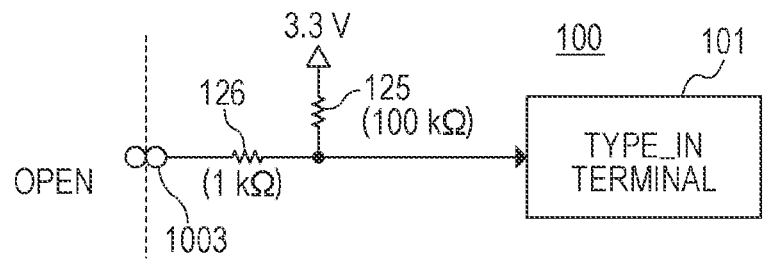

FIG. 7C is an illustration of peripheral circuits of the TYPE terminal 1003 in a state where the TYPE terminal 1003 and TYPE terminal 2003 are not in contact, even though mounting of the accessory device to the camera body 100 has been completed, due to faulty contact or the like. In this case, the voltage value input to the TYPE_IN terminal is decided by the resistor 125 (100 kΩ) in the camera body 100 alone, and the value after A-to-D conversion is approximately "0x03FF".

Figure 7D:
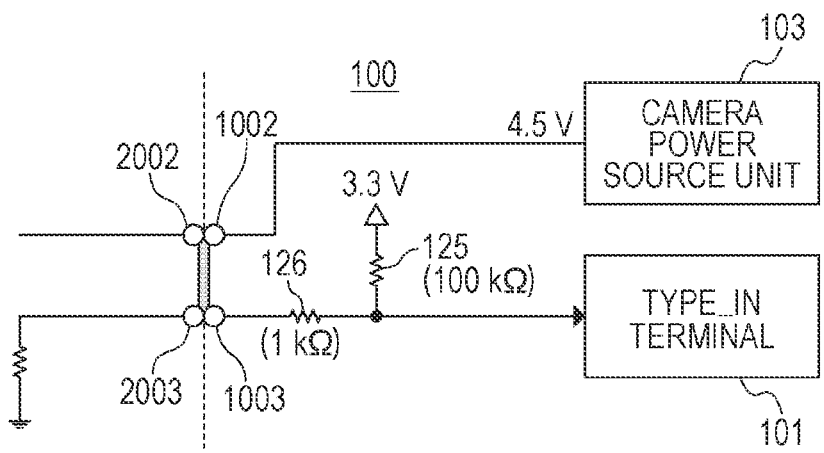

FIG. 7D is an illustration of peripheral circuits of the TYPE terminal 1003 in a state where the TYPE terminal 1003 and the VBAT terminal 1002 have short-circuited. A case will be considered here where determination of the type of accessory device mounted to the camera body 100 is performed before supply of power source to the VBAT terminal 1002 and VBAT terminal 2002. In a case where the voltages of the VBAT terminal 1002 and VBAT terminal 2002 when power source is not being supplied are the same as that of the PGND terminals, the voltage of the TYPE terminal 1003 becomes generally equal to the voltage of the PGND terminals when the TYPE terminal 1003 and VBAT terminal 1002 short-circuit. At this time, the value input to the TYPE_IN terminal is decided by the ratio of voltage dividing by the resistor 125 (100 kΩ) and the resistor 126 (1 kΩ) within the camera body 100, and is approximately "0x000A".

Next, a case will be considered where determination of the type of the accessory device mounted to the camera body 100 is performed after supply of power source to the VBAT terminal 1002 and VBAT terminal 2002. In this case, if the TYPE terminal 1003 and the VBAT terminal 1002 short-circuit, VBAT voltage (4.5 V in the present embodiment) will be applied to the TYPE terminal 1003. The value input to the TYPE_IN terminal at this time is approximately "0x03FF".

Figure 7E:
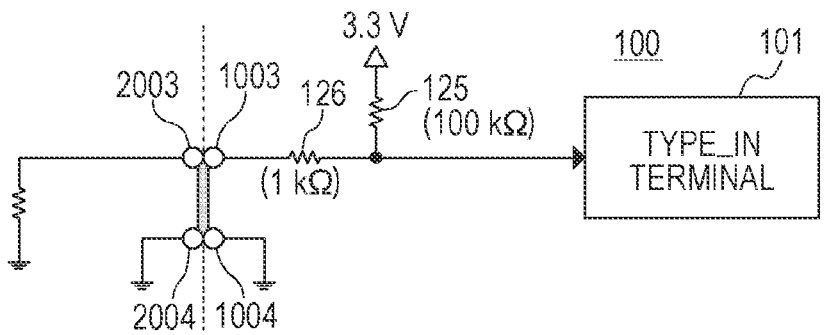

FIG. 7E is an illustration of peripheral circuits of the TYPE terminal 1003 in a state where the TYPE terminal 1003 and the PGND terminal 1004 have short-circuited. In a case where the TYPE terminal 1003 and the PGND terminal 1004 have short-circuited, the voltage of the TYPE terminal 1003 is approximately equal to the voltage of the PGND terminal 1004 (voltage of the reference potential for VBAT voltage). At this time, the value input to the TYPE_IN terminal is decided by the ratio of voltage dividing by the resistor 125 (100 kΩ) and the resistor 126 (1 kΩ) within the camera body 100, and is approximately "0x000A".

As described above, in a case where some sort of abnormality occurs in the connection state of the TYPE terminal 1003 and TYPE terminal 2003, the voltage of the TYPE terminal 1003 becomes generally equal to the VBAT voltage or the voltage of the PGND terminal 1004. Accordingly, the range of voltage of the TYPE terminal 1003 where determination is made in the present embodiment that a lens apparatus is properly mounted to the camera body 100 is set to a voltage range that does not include the VBAT voltage and the voltage of the PGND terminal 1004. The Table below is a correlation table of input values of the TYPE terminal and results of the camera control unit 101 distinguishing states of mounting.

TABLE

| TYPE_IN | 0x0000 through 0x007F | 0x0080 through 0x017F | 0x0180 through 0x027F | 0x0280 through 0x037F | 0x0380 through 0x03FF |
|---|---|---|---|---|---|
| Determination results | Error | Lens apparatus 200 | — | Lens apparatus 300 | Error |
| Communication voltage | — | 3.0 V | — | 5.0 V | — |

It can be seen from the Table that the camera control unit 101 determines the lens apparatus 200 to be mounted to the camera body 100 if the input value of the TYPE_IN terminal is in the range of "0x0080 through 0x017F". This range "0x0080 through 0x017F" does not include the input value of the TYPE_IN terminal in a case where the voltage of the TYPE terminal 1003 is the VBAT voltage or the voltage of the PGND terminal 1004. Accordingly, the camera control unit 101 can determine that the lens apparatus 200 has been mounted to the camera body 100 only in a case where the lens apparatus 200 has been properly mounted to the camera body 100. In a case of having determined that the lens apparatus 200 has been mounted, the camera control unit 101 performs communication with the lens apparatus 200 using communication voltage 3.0 V.

In the same way, the camera control unit 101 determines the lens apparatus 300 to be mounted to the camera body 100 if the input value of the TYPE_IN terminal is in the range of "0x0280 through 0x037F". This range "0x0280 through 0x037F" does not include the input value of the TYPE_IN terminal in a case where the voltage of the TYPE terminal 1003 is the VBAT voltage or the voltage of the PGND terminal 1004. Accordingly, the camera control unit 101 can determine that the lens apparatus 300 has been mounted to the camera body 100 only in a case where the lens apparatus 300 has been properly mounted to the camera body 100. In a case of having determined that the lens apparatus 300 has been mounted, the camera control unit 101 performs communication with the lens apparatus 300 using communication voltage 5.0 V. Thus, determining the correlation between the input values of the TYPE_IN terminal and the results of the camera control unit 101 determining the state of mounting enables the type of mounted lens apparatus to be appropriately distinguished.

On the other hand, the camera control unit 101 determines that some sort of abnormality is occurring with regard to the mounting state of the camera body 100 and the accessory device if the input value of the TYPE_IN terminal is in the range of "0x0000 through 0x007F". This range "0x0000 through 0x007F" includes the input value of the TYPE_IN terminal "0x000A" in a case where the voltages of the TYPE terminal 1003 and the PGND terminal 1004 are generally equal. In this case, the camera control unit 101 does not communicate with the lens apparatus mounted to the camera body. Thus, nonrated voltage can be prevented from being applied to the accessory device in a case where an abnormality has occurred in the connection state of the TYPE terminal.

Again, the camera control unit 101 determines that some sort of abnormality is occurring with regard to the mounting state of the camera body 100 and the accessory device if the input value of the TYPE_IN terminal is in the range of "0x0380 through 0x03FF". This range "0x0380 through 0x03FF" includes the input value of the TYPE_IN terminal "0x03FF" in a case where the voltage of the TYPE terminal 1003 and the VBAT voltage are generally equal. In this case, the camera control unit 101 does not communicate with the lens apparatus mounted to the camera body. Thus, nonrated voltage can be prevented from being applied to the accessory device in a case where an abnormality has occurred in the connection state of the TYPE terminal.

Figure 8:
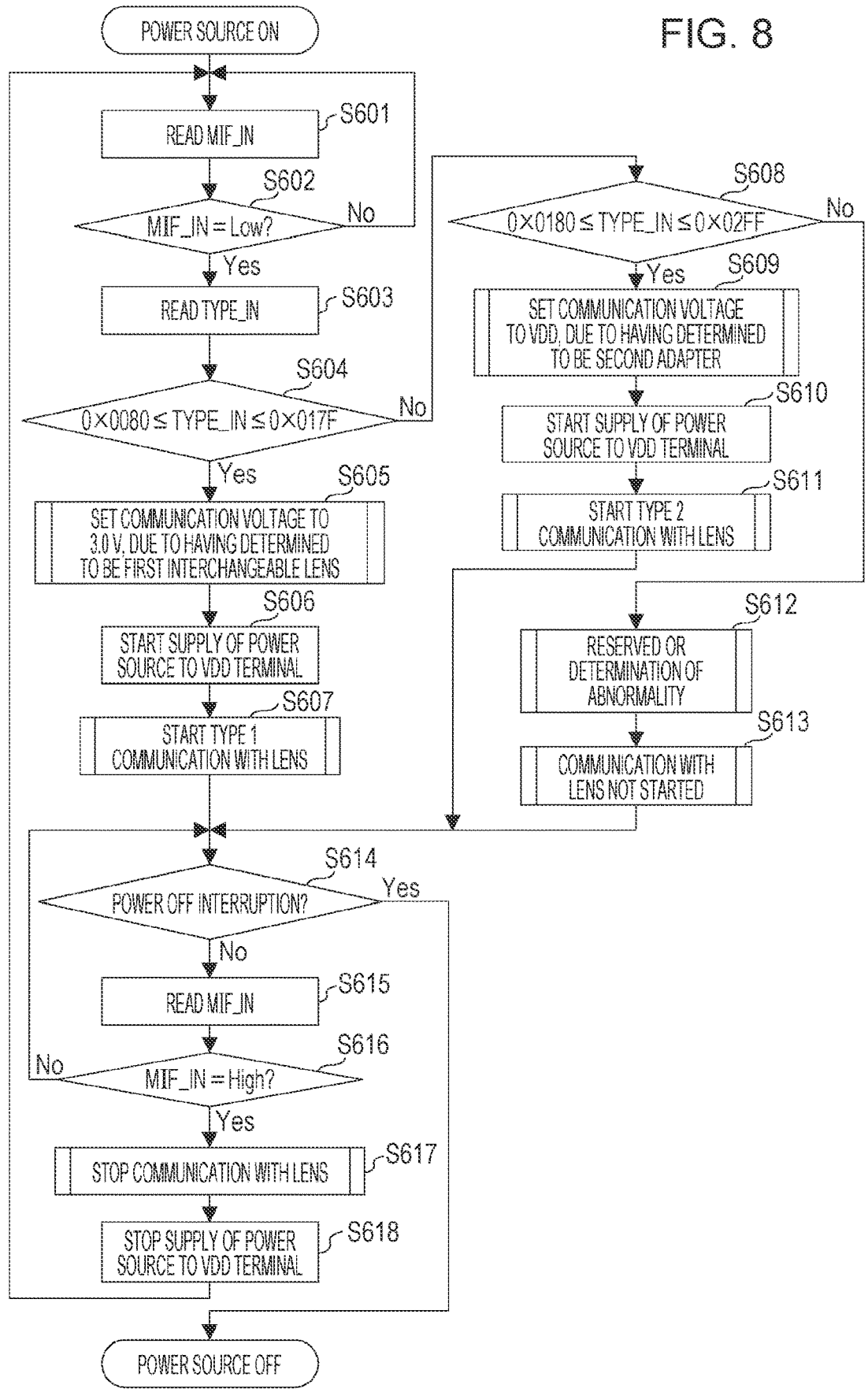
FIG. 8 is a flowchart illustrating an operation flow of the imaging apparatus when the lens apparatus is mounted.

Next, an operation flow of the camera body 100 will be described with reference to the flowchart in FIG. 8. This flow is carried out following a computer program stored in the camera control unit 101. The flowchart in FIG. 8 starts from a state where the power source of the camera body 100 is turned on by operation of a power switch of the camera body 100 that is omitted from illustration. Note that steps in the flowchart are indicated by "S".

First, the camera control unit 101 obtains the voltage value of an MIF_IN terminal in S601, and stores this in a random access memory (RAM) region that is omitted from illustration.

Next, in S602, the camera control unit 101 determines whether or not the voltage value of the MIF_IN terminal stored in S601 is at a Low level. In a case where the voltage value of the MIF_IN terminal is not at the Low level, no lens apparatus is mounted to the camera body 100, so the flow returns to S601 (No in S602). In a case where the voltage value of the MIF_IN terminal is at the Low level, determination is made that a lens apparatus is mounted to the camera body 100, and the flow advances to S603.

In S603, the camera control unit 101 obtains the voltage value of TYPE_IN, and stores this in a RAM region omitted from illustration.

Determination is made in S604 regarding whether or not the value of TYPE_IN stored in S603 is within the range of 0x0080 or above and 0x017F or below. If Yes is returned in S604, the camera control unit 101 determines that the lens apparatus that has been mounted is the lens apparatus 200. In this case, the flow advances to S605.

In S605, the camera control unit 101 controls the power source switching unit 104 so that the power supply voltage supplied to the first communication interface unit 102a is 3.0 V.

Thereafter, supply of power source to the VDD terminal 1001 by the power source unit 103 is started in S606, and communication with the lens apparatus 200 by the first communication is started in S607.

On the other hand, in a case where No is returned in S604, the flow advances to S608, where determination is made whether or not the value of TYPE_IN stored in S603 is within the range of 0x0180 or above and 0x02FF or below. If Yes is returned in S608, the camera control unit 101 determines that the lens apparatus that has been mounted is the lens apparatus 300. In this case, the flow advances to S609.

In S609, the camera control unit 101 controls the power source switching unit 104 so that the power supply voltage supplied to the first communication interface unit 102a is 5.0 V.

Thereafter, power source supply to the VDD terminal 1001 by the power source unit 103 is started in S610, and in S611 the first communication with the lens apparatus 300 is started.

On the other hand, in a case where No is returned in S608, the flow advances to S612. In this case, the camera control unit 101 determines that the accessory device that has been mounted is an accessory device that the camera body 100 cannot control, or that an abnormality is occurring in the mounting state, and the flow advances to S613.

In S613, the camera control unit 101 does not perform communication with the accessory, and makes a display on a display unit, omitted from illustration, that is provided to the camera body 100, to the effect that a connection error has occurred.

Determination of whether or not the power source of the camera body 100 has been turned off, by an operation of the power switch of the camera body 100, is made in S614. If determination is made that the power switch has been turned off, processing is performed to turn the power source off. Otherwise, the flow advances to S615.

In S615, the camera control unit 101 reads in the voltage value at the MIF_IN terminal, and stores this in a RAM region that is omitted from illustration.

In S616, determination is made regarding whether the voltage value of MIF_IN stored in S615 is equivalent to a High level. If the voltage value of MIF_IN is High, determination is made that the lens apparatus which had been mounted to the camera body 100 has been detached. On the other hand, in a case where the voltage value of MIF_IN is Low, determination is made that the lens apparatus remains mounted, and the flow returns to S614.

In S617, the camera control unit 101 stops communication with the lens apparatus, and in S618 supply of power source to the VDD terminal 1001 by the power source unit 103 is stopped. Thereafter, the flow advances to S601.

Next, communication performed between the camera body 100 and an accessory device mounted to the camera body 100 will be described. First, the first communication will be described. The first communication is one type of communication performed between the camera body 100 and a lens apparatus mounted to the camera body 100. The first communication is performed using the LCLK terminals, DCL terminal, and DLC terminals. Further, the first communication is carried out using a clock-synchronous serial communication method. Note that the first communication may be performed using an asynchronous serial communication method. It that case, the LCLK terminal is used as a terminal to notify the lens apparatus of a data transmission request from the camera body 100.

The lens apparatus 200 and lens apparatus 300 both handle the first communication. However, the communication voltage for the first communication differs between the lens apparatus 200 and the lens apparatus 300, as described earlier.

The camera body 100 transmits a control command for controlling the lens apparatus, to the lens apparatus by the first communication. The control command includes commands for driving the driving units (omitted from illustration) of the lens apparatus. Examples of driving units of the lens apparatus include a focus lens, zoom lens, and diaphragm.

The lens apparatus that has received the control command transmitted by the first communication performs operation in accordance with the command. In response to the control command, the lens apparatus transmits information relating to the state of itself (state information) to the camera body 100, by the first communication. Information relating to state as used here includes information relating to position of focus lens, focal length, and aperture value. Thus, the first communication is communication primarily used for controlling the lens apparatus.

Next, the second communication will be described. The second communication is a type of communication performed between the camera body 100 and the lens apparatus 200 mounted to the camera body 100, and is asynchronous communication performed using the DLC2 terminals 1009 and 2009. Note that the second communication is not performed when the lens apparatus 300 is mounted to the camera body 100, since the lens apparatus 300 does not have a DLC2 terminal. Accordingly, the DLC2 terminal 1009 is not used in a case where the lens apparatus 300 is mounted to the camera body 100.

In the second communication, the lens apparatus 200 serves as the communication master, and transmits the optical data such as the position of the focus lens, the position of the zoom lens, aperture value, state of the image stabilization lens, and so forth, at the lens apparatus 200, to the camera body 100. The type and order of data that the lens apparatus 200 transmits to the camera body 100 using the second communication is specified by the camera body 100 using the first communication.

Figure 9:
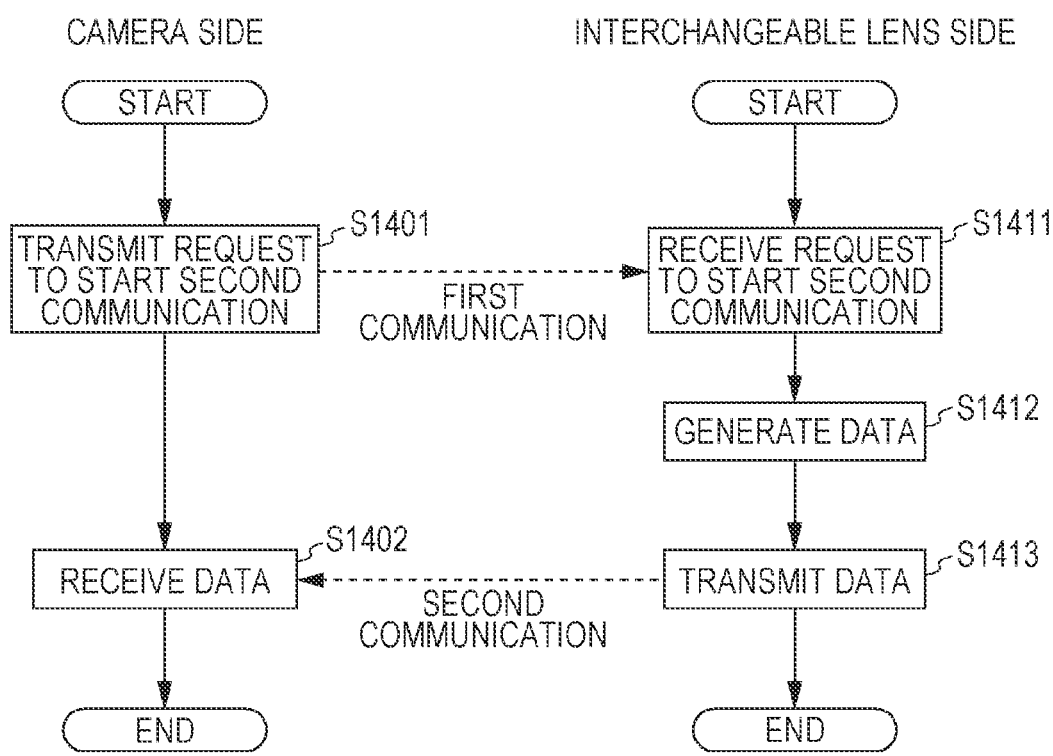
FIG. 9 is a flowchart illustrating a second communication flow.

Now, the flow of the second communication will be described with reference to FIG. 9. The flowchart in FIG. 9 starts from the timing at which imaging control is started. Note that steps are represented by S in the flowchart.

In S1401, the camera body 100 transmits to the lens apparatus 200 a start request requesting start of the second communication, using the first communication. The start request transmitted in S1401 includes registration communication commands in which the type of data that the camera body 100 desires to receive from the lens apparatus 200 using the second communication, and the order of reception, are registered beforehand.

The lens apparatus 200 receives the start request from the camera body 100 in S1411. In S1412, the lens apparatus 200 generates the types of data specified by the registration communication command included in the start request, in the specified order.

In S1413, the lens apparatus 200 transmits the data generated in S1412 to the camera body 100 using the second communication. That is to say, the lens apparatus 200 transmits the data generated in S1412 to the camera body 100 using the DLC2 terminal 2009.

The camera body 100 receives the data transmitted from the lens apparatus 200 by second communication in S1402.

In a case where imaging control is started again after S1402 or S1413, the control illustrated in FIG. 9 is started again.

Thus, the start request for the second communication is made by the first communication, and transmission of data from the lens apparatus 200 to the camera body 100 by the second communication is performed using the DLC2 terminal 2009. Accordingly, providing the DLC2 terminal 2009 separate from the electric contacts used for first communication, and performing the second communication, enables optical data to be transmitted from the lens apparatus 200 to the camera body 100 without interfering with other communication that needs to be performed by the first communication. It should be noted that the second communication cannot be performed if the first communication has not been established, since the start request for the second communication is given using the first communication.

Next, the third communication will be described. The third communication is communication performed among the lens apparatus 200, intermediate accessory device 400, intermediate accessory device 500, and camera body 100, and is asynchronous communication carried out using the DCA terminals and CS terminals.

As described earlier, the lens apparatus 300 does not have a DCA terminal or CS terminal, and so the camera body 100 and lens apparatus 300 do not perform the third communication in a case where the lens apparatus 300 is mounted to the camera body 100 via the intermediate accessory device 400. However, in this case, the camera body 100 and the intermediate accessory device 400 may perform the third communication.

In the third communication, the communication master is the camera body 100 and the communication slaves are the lens apparatus 200, intermediate accessory device 400, and intermediate accessory device 500. Although FIGS. 5A and 5B illustrate only one intermediate accessory device 500 being mounted between the camera body 100 and lens apparatus 200, there are cases where multiple intermediate accessory devices are mounted between the camera body 100 and lens apparatus 200. Accordingly, in the third communication, there are cases where multiple communication slaves are serially connected to one communication master. Accordingly, in the third communication, communication can be performed in a broadcast communication mode where the camera body 100 transmits signals to the multiple accessories at the same time, and peer-to-peer (P2P) mode where a particular slave is specified and communication is performed.

The DCA terminals both function as terminals to transmit/receive data in the broadcast communication mode and P2P mode in the third communication. On the other hand, the functions of the CS terminals differ between the broadcast communication mode and P2P mode. Hereinafter, the functions of the CS terminals in the broadcast communication mode and P2P mode will be described, by way of an example of a case where the lens apparatus 200 is mounted to the camera body 100 via the intermediate accessory device 500.

Figure 10:
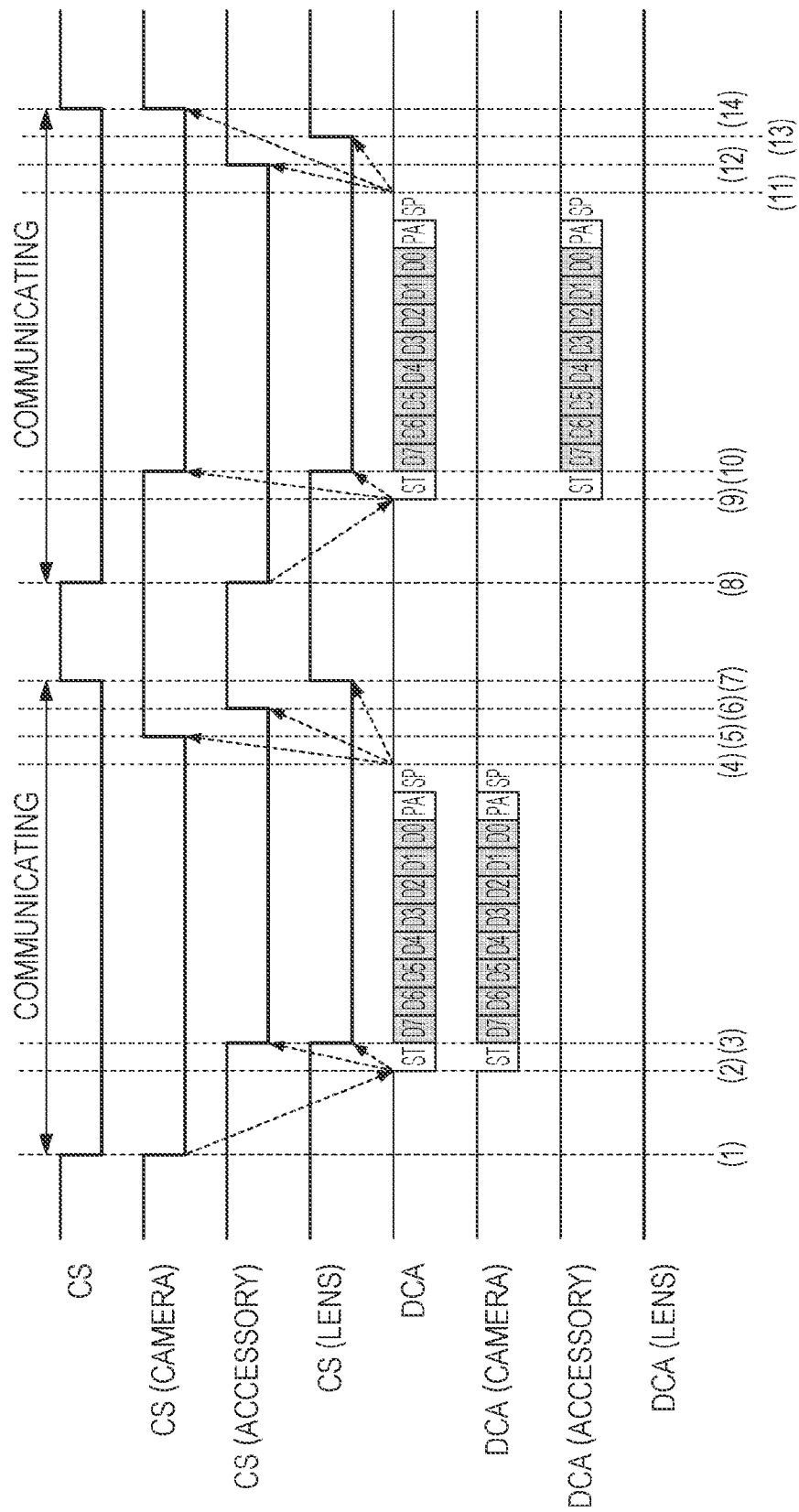
FIG. 10 is a diagram describing a broadcast communication mode in third communication.

FIG. 10 illustrates communication control timing in broadcast communication exchanged among the camera control unit 101, lens control unit 201, and accessory control unit 501. The CS terminals of the camera control unit 101, lens control unit 201, and accessory control unit 501, are expressed as CS (camera), CS (lens), and CS (accessory). Also, the outputs of the DCA terminals of the camera control unit 101, lens control unit 201, and accessory control unit 501, are expressed as DCA (camera), DCA (lens), and DCA (accessory), respectively. The signal waveform of a signal line made up of the CS terminals (CS signal line) and signal waveform of a signal line made up of the DCA terminals (DCA signal line) are respectively denoted by CS and DCA. FIG. 10 illustrates a case of the accessory control unit 501 performing broadcast communication to the camera control unit 101 and lens control unit 201 in response to broadcast communication performed from the camera control unit 101 to the lens control unit 201 and accessory control unit 501.

At the timing of (1) shown in FIG. 10, the camera control unit 101 that is the communication master outputs Low to the CS terminals, to notify the lens control unit 201 and accessory control unit 501 that are communication slaves, that broadcast communication is going to be started. Next, at the timing of (2) shown in FIG. 10, the camera control unit 101 outputs data to be transmitted, to the DCA terminals.

Upon detecting a start bit ST of the signal input from their DCA terminals at the timing of (3) in FIG. 10, the lens control unit 201 and accessory control unit 501 start Low output to their CS terminals. Note that at this point, the camera control unit 101 is already outputting Low to the CS terminal at the timing of (1), so the level on the CS signal line is unchanged.

When output of the data to be transmitted has been completed up to the stop bit SP at the timing of (4) in FIG. 10, the camera control unit 101 releases the Low output to the CS terminal at the timing of (5). On the other hand, upon having received up to the stop bit SP, the lens control unit 201 and accessory control unit 501 perform analysis of the received data and internal processing relating to the received data. In a case where the internal processing has been completed, and preparation has been made to receive the next data, the lens control unit 201 and accessory control unit 501 release the Low output to their CS terminals at the timing of (6) and (7), respectively.

Now, the amount of time required for the analysis of the received data and internal processing relating to the received data differs depending on the processing abilities of the individual control units. Accordingly, each control unit needs to comprehend the timing at which the internal processing relating to the received data has been completed at all of the other microprocessors.

Note that the CS terminals in the present embodiment are open-type output terminals, as mentioned earlier. Accordingly, when all of the camera control unit 101, lens control unit 201, and accessory control unit 501 release the Low output to their respective CS terminals, the level on the CS signal line goes to High. That is to say, the control units that are involved in the broadcast communication can judge that preparation for the next communication has been made at the other control units, by confirming that the level of the CS signals line has gone to High, and accordingly can appropriately perform the next communication.

At the timing of (8), the accessory control unit 501 starts Low output to the CS terminal, to notify the camera control unit 101 and lens control unit 201 that broadcast communication is going to be started. Next, the accessory control unit 501 outputs data to be transmitted to the DCA terminal at the timing of (9).

Upon having detected the start bit ST input from their DCA terminals, the camera control unit 101 and lens control unit 201 start Low output to their CS terminals at the timing of (10). Note that the accessory control unit 501 has already started Low output to the CS terminal at this point, so the level of the CS signal line is unchanged. After completing output of the stop bit SP at the timing of (11), the accessory control unit 501 releases the Low output to the CS terminal at the timing of (12).

After having received the stop bit SP input from their DCA terminals, the camera control unit 101 and lens control unit 201 perform analysis of the received data and internal processing associated with the received data. After preparation to receive the next data has been made, the camera control unit 101 and lens control unit 201 release the Low output to their CS terminals, at the timing of (13) and (14), respectively. Thus, the CS terminals serve in broadcast communication to make notification of timing to start broadcast communication and timing that preparation for reception has been completed at all microprocessors, by change in voltage.

Figure 11:
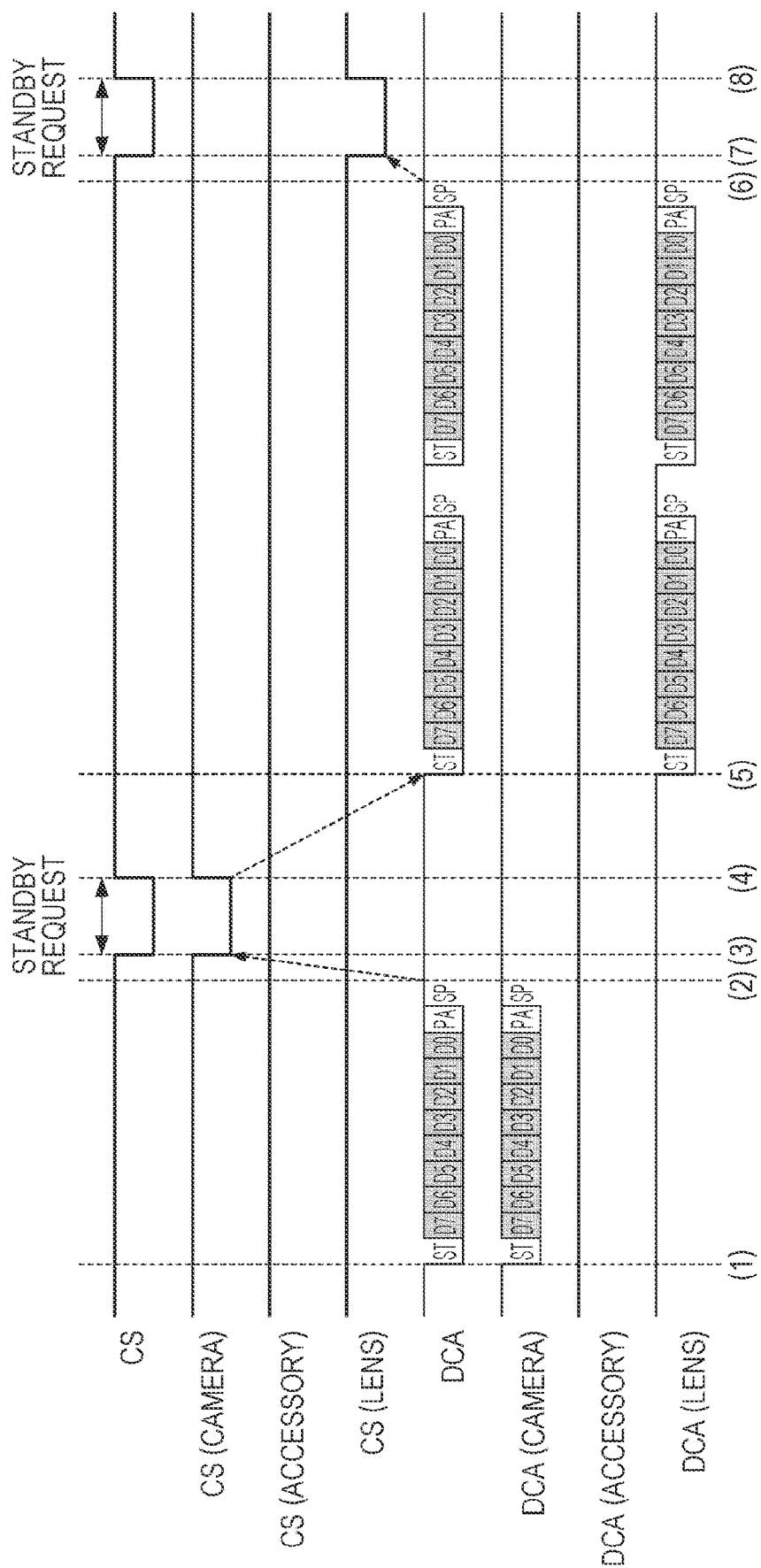
FIG. 11 is a diagram describing a P2P communication mode in third communication.

Next, the functions to the CS terminal in P2P communication will be described. FIG. 11 illustrates communication timing on P2P communication exchanged between the camera control unit 101, lens control unit 201, and accessory control unit 501. An example will be described here where one byte worth of data is transmitted from the camera control unit 101 to the lens control unit 201, and the lens control unit 201 transmits two bytes worth of data to the camera control unit 101 in response to that data.

First, the camera control unit 101 uses the DCA terminal to transmit a command to the lens control unit 201 to cause particular data to be transmitted, at the timing of (1) shown in FIG. 11. After the timing of (2) where output has been completed up to the stop bit SP, the camera control unit 101 starts Low output to the CS terminal at the timing of (3). The camera control unit 101 performs preparation to receive data while outputting Low to the CS terminal, and at the timing of (4) where preparation has been made, releases the Low output to the CS terminal.

On the other hand, after having detected the Low signal at the CS terminal output by the camera control unit 101, the lens control unit 201 analyzes the command received from the camera control unit 101, and performs internal processing relating to this command. After having confirmed that the Low output of the CS terminal has been released, the lens control unit 201 transmits data, corresponding to the command received from the camera control unit 101, from the DCA terminal. After the timing of (6) where output has been completed up to output of the stop bit SP of the second byte, the lens control unit 201 starts Low output to the CS terminal at the timing of (7).

Subsequently, the lens control unit 201 releases Low output to the CS terminal at the timing of (8) where preparation for reception of the next data has been made. Note that the accessory control unit 501, which has not been specified as a communication party in the P2P communication is not involved in operation of the CS signal line and DCA signal line whatsoever. Thus, in the P2P mode, the CS terminals notify the timing at which data transmission has been completed at the data transmitting side device, and the timing at which preparation for data reception has been completed at the data receiving side device, by change in voltage value.

As described above, in the third communication, the functions of the CS terminals are different between the broadcast communication mode and the P2P mode. This realizes the broadcast communication mode and the P2P mode using only two signal lines. Further, transmission/reception of data in the third communication is performed by the DCA terminals of which the input/output interface is a CMOS type. Accordingly, high-speed communication can be realized even if the input/output interface of the CS terminals, which are used simply for notification of various types of timings in the third communication, are of the open type.

Next, communication voltage of the first through third communication will be described. In a case where the lens apparatus 200 is mounted to the camera body 100, the first communication, the second communication, and the third communication can be performed, as described earlier. On the other hand, in a case where the lens apparatus 300 is mounted to the camera body 100, the first communication and the third communication can be performed. That is to say, the case where the lens apparatus 200 is mounted to the camera body 100 has more types of communication to be performed as compared to a case where the lens apparatus 300 has been mounted. Accordingly, the communication voltage in the case where the lens apparatus 200 is mounted to the camera body 100 is preferably lower from the perspective of reducing power consumption. To this end, the communication voltage for the first communication in a case where the lens apparatus 200 has been mounted (3.0 V) is set to be lower than the communication voltage in a case where the lens apparatus 300 has been mounted (5.0 V).

Also, the configuration of the second/third communication interface unit 202b can be simplified by the communication voltage of the third communication being the same between a case where the lens apparatus 200 has been mounted and a case where the lens apparatus 300 has been mounted. At this time, the communication voltage of the third communication preferably is equal to the lower of the communication voltage of the first communication in a case where the lens apparatus 200 has been mounted and the communication voltage of the first communication in a case where the lens apparatus 300 has been mounted. Accordingly, the power consumption for performing the third communication can be reduced.

Next, the array order of the electric contacts will be described, taking into consideration the circuit configurations and roles of the electric contacts of the camera body 100, lens apparatus 200, and intermediate accessory devices 400 and 500 into consideration. As described above, drive control and obtaining state information of the lens apparatus 200 and lens apparatus 300 is performed by the first communication. Accordingly, even if the second communication and the third communication cannot be performed due to faulty contact among the electric contacts, primary control of the lens apparatus 200 and lens apparatus 300 can be performed as long as the first communication has been established. Conversely, if the first communication becomes unavailable due to faulty contact among the electric contacts, the camera body 100 can no longer control the lens apparatus 200 or lens apparatus 300. Accordingly, it can be said that the electric contacts used for the first communication are more important as compared to the electric contacts used for the second communication and the third communication.

Accordingly, the electric contacts are arrayed in the present embodiment such that the amount of wear of the first camera-side electric contact group due to mounting and detaching accessory devices is smaller than the electric contacts 1009 through 1011 used for the second communication or the third communication. This will be described with reference to FIGS. 4A and 4B.

When mounting the lens apparatus 200 to the camera body 100, the lens apparatus 200 moves (rotates) from the position illustrated in FIG. 4B to the position illustrated in FIG. 4A, with respect to the camera body 100. At this time, each of the electric contacts held by the camera-side contact holding member 154 come into contact with the electric contacts held by the accessory-side contact holding member 254 at least once. The greater the number of times that an electric contact comes into contact with the electric contacts held at the accessory-side contact holding member 254, the greater the amount of wear is.

The timings at which the electric contacts 1001 through 1012 start to come into contact with the electric contacts held by the accessory-side contact holding member 254 during a period from starting to mount the lens apparatus 200 to the camera body 100 up to the mounting being completed differ for each. For example, the DGND terminal 1012 comes into contact with an electric contact held at the accessory-side contact holding member 254 the earliest of all the electric contacts 1001 through 1012 when mounting the lens apparatus 200 to the camera body 100. The DGND terminal 1012 comes into contact with the electric contacts 2005 through 2012 until mounting of the lens apparatus 200 is complete, so the number of times that the DGND terminal 1012 comes into contact with electric contacts held at the accessory-side contact holding member 254 is eight. On the other hand, the CS terminal 1011 that comes into contact with the electric contacts held at the accessory-side contact holding member 254 next after the DGND terminal 1012 comes into contact with the electric contacts 2005 through 2011 until mounting of the lens apparatus 200 is complete, so the number of times that the CS terminal 1011 comes into contact with electric contacts held at the accessory-side contact holding member 254 is seven, which is less than that of the DGND terminal 1012. Thus, when mounting the lens apparatus 200 to the camera body 100, the earlier the timing of an electric contact starting to come into contact with the electric contacts held by the accessory-side contact holding member 254 is, the greater the number of times of contact with the electric contacts held by the accessory-side contact holding member 254 is.

In the array of electric contacts according to the present embodiment, when mounting the lens apparatus 200, the electric contacts 1009 through 1011 that are used for the second or third communication come into contact with electric contacts provided at the accessory-side contact holding member 254 before the electric contacts 1006 through 1008 that are used for the first communication. According to this array of the electric contacts, the amount of wear of the first camera-side electric contact group used for the first communication can be reduced as compared to that of the electric contacts 1009 through 1011 that are used for the second or third communication. Thus, occurrence of faulty communication due to wear of the electric contacts can be reduced.

Note that the electric contacts 2006 through 2008, which are the first lens-side electric contact group, can be said to be disposed at a position where the amount of wear when mounting and detaching the lens apparatus 200 to and from the camera body 100 is greater as compared to the electric contacts 2009 through 2011. However, multiple types of camera accessories are mounted to the camera body 100 as illustrated in FIG. 1, and so the amount of wear of the electric contacts at the lens apparatus 200 is smaller than that at the camera body 100. Accordingly, the electric contacts are arrayed in the present embodiment so that the amount of wear of the first camera-side electric contact group is smaller, giving consideration to the electric contacts at the camera body 100 side where the electric contacts wear more readily.

Figure 12A:
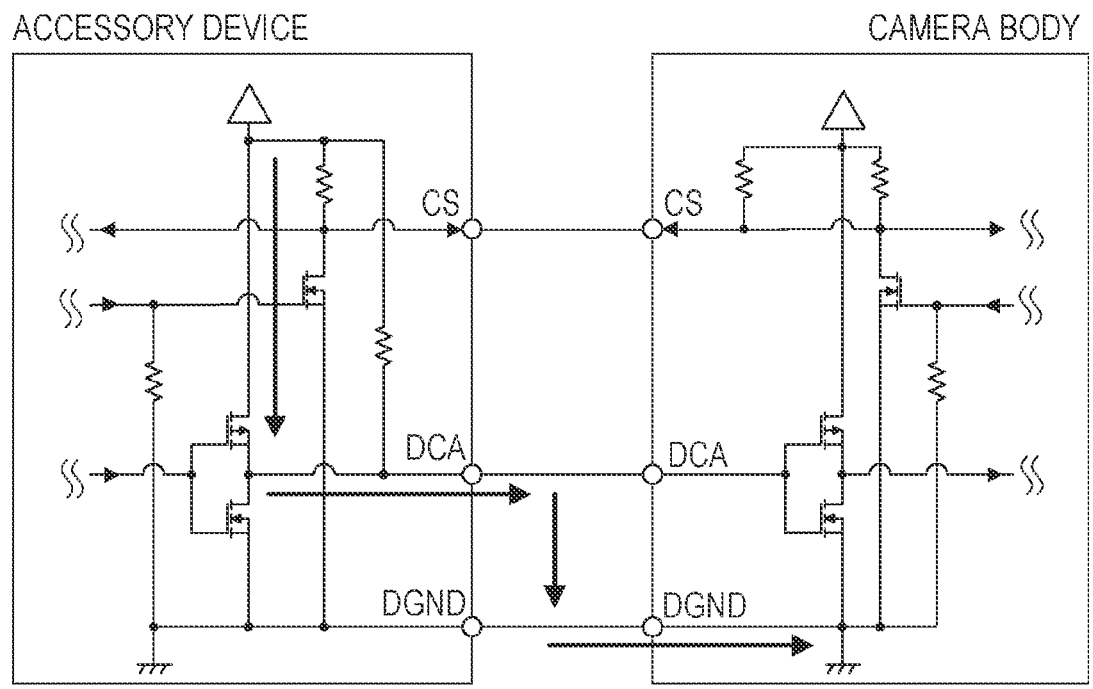
FIGS. 12A and 12B are diagrams describing cases where a DGND terminal and a terminal adjacent to the DGND terminal short-circuit.
Figure 12B:
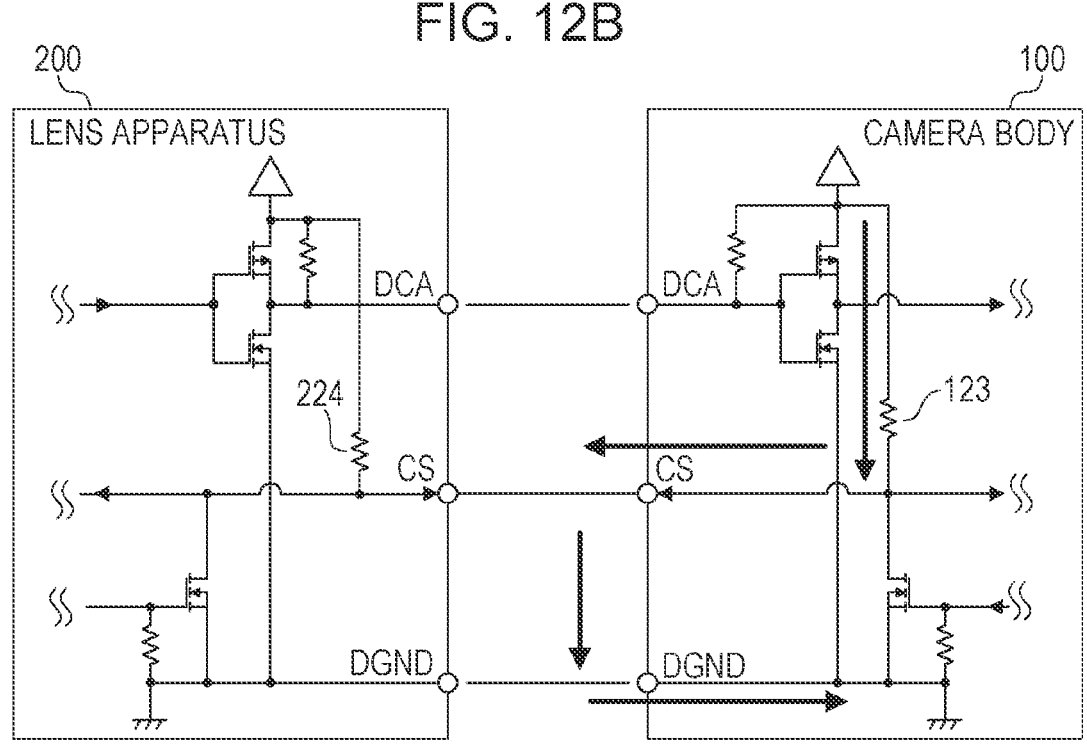

Next, the order of the array of the DGND terminal, CS terminal, and DCA terminal will be described with reference to FIGS. 12A and 12B. First, a case will be considered as a comparative example, in which the DCA terminal is disposed adjacent to the DGND terminal. The peripheral circuits of the CS terminal, DCA terminal, and DGND terminal in this case are illustrated in FIG. 12A. The DCA terminal is a CMOS type input/output interface terminal, as described earlier. In a case where the DGND terminal and DCA terminal are short-circuited due to an electroconductive foreign substance becoming lodged between the camera body and the accessory device in FIG. 12A or the like, when High level is output to the DCA terminal, a large current will flow from the DCA terminal toward the DGND terminal. This is because the resistance of the CMOS type interface is low when outputting High level. In this case, a great current may flow into the accessory device and the camera body that is performing the third communication, and affect the internal circuits.

On the other hand, the CS terminal is disposed between the DCA terminal and DGND terminal in the present embodiment. FIG. 12B illustrates the peripheral circuits of the CS terminal, DCA terminal, and DGND terminal of the camera body 100 and the lens apparatus 200 serving as an accessory device according to the present embodiment. As described above, the CS terminal is an open type output terminal. Accordingly, even if the DGND terminal and CS terminal short-circuit in FIG. 12B, only a small current will flow to the DGND terminal. This is because the CS terminal is pulled up to the power source potential via a resistor. Thus, this arrangement where the electric contact adjacent to the DGND terminal is the CS terminal which is an open type output terminal enables electrical effects on the internal circuits of the accessory device and camera body 100 to be reduced in a case where electric contacts are connected to each other unintentionally.

The DLC2 terminal is disposed adjacent to the electric contact group used for the first communication in the present embodiment. That is to say, the DLC2 terminal is disposed adjacent to the LCLK terminal. The reason for this will be described by way of comparison with a case where the CS terminal or DCA terminal used for the first communication is disposed. Assumption will be made in the following that the lens apparatus 300 has been mounted to the camera body via an intermediate accessory device that is capable of the third communication with the camera body. Accordingly, the communication voltage of the first communication is 5.0 V, the communication voltage of the third communication is 3.0 V, and second communication is not performed.

Figure 13A:
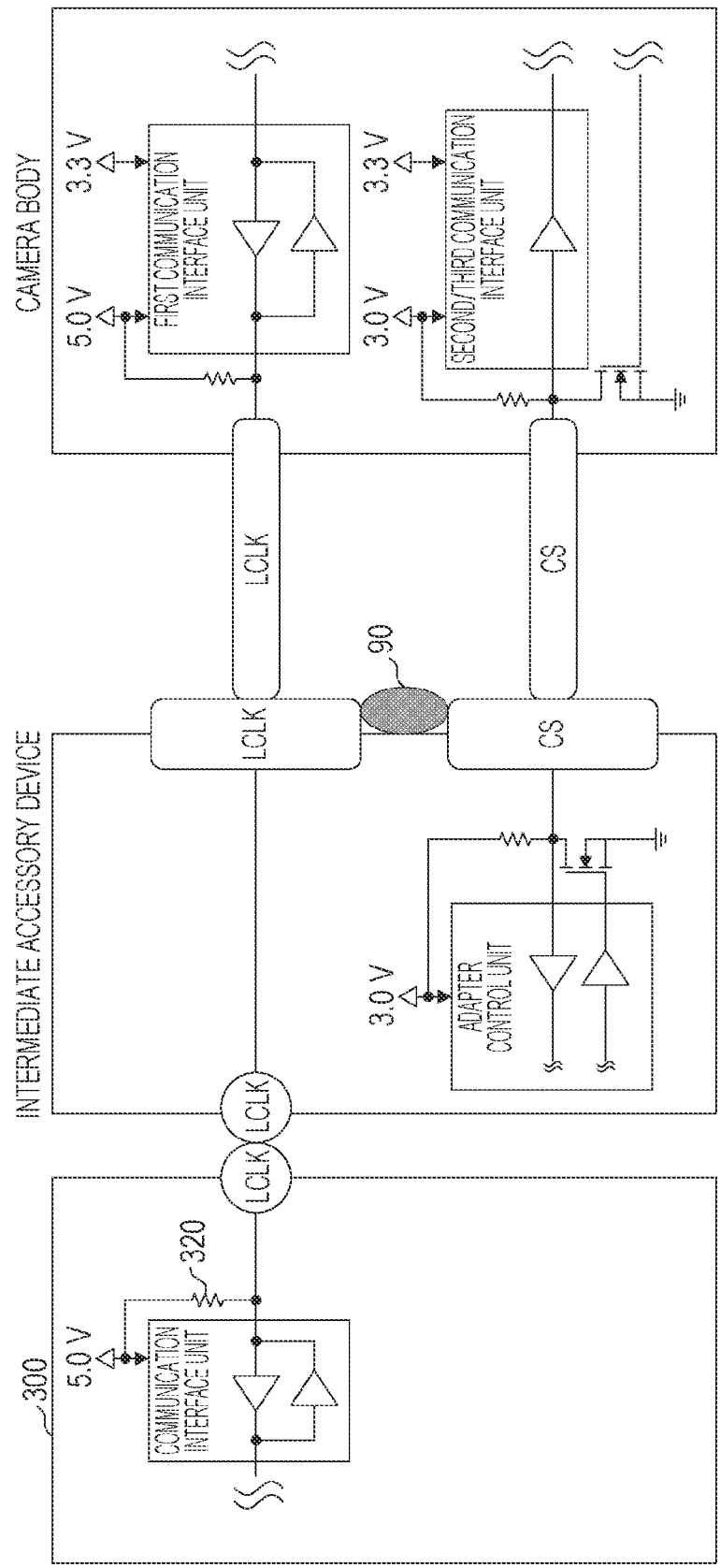
FIGS. 13A through 13C are diagrams describing cases where a LCLK terminal and a terminal adjacent to the LCLK terminal short-circuit.

FIG. 13A illustrates the peripheral circuits of the LCLK terminal and CS terminal in a case where the CS terminal is disposed adjacent to the LCLK terminal. The LCLK terminal is pulled up to 5.0 V, which is the communication voltage for first communication, at each of the camera body and lens apparatus 300. On the other hand, the CS terminal is pulled up to 3.0 V, which is the communication voltage for the third communication at the camera body and the intermediate accessory device. Now, if an electroconductive foreign substance 90 becomes lodged between the LCLK terminal and the CS terminal, and the LCLK terminal and the CS terminal are short-circuited, voltage exceeding 3.0 V may be applied to the CS terminal. At this time, voltage exceeding the operating voltage (3.0 V) will be applied to the second/third communication interface unit of the camera body and the accessory control unit of the intermediate accessory device, which is undesirable.

Figure 13B:
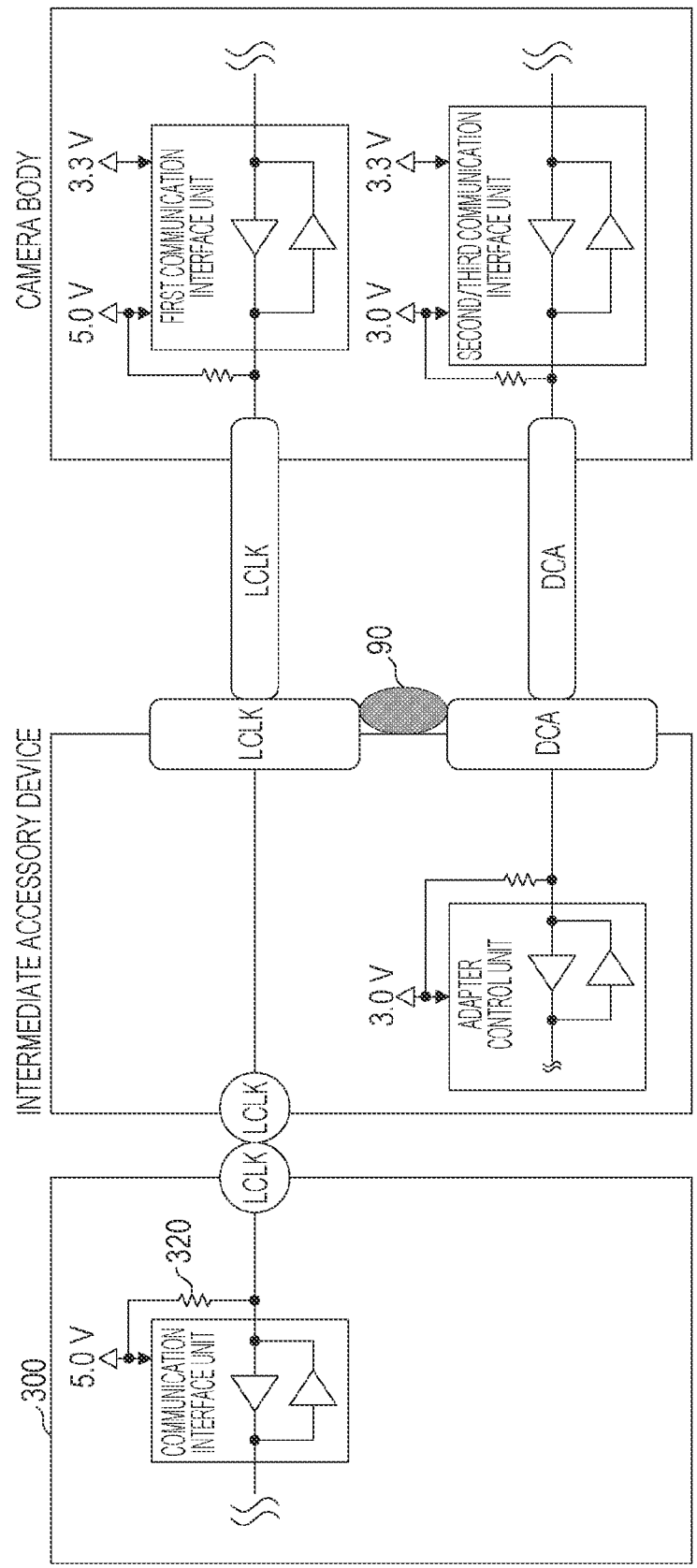

FIG. 13B illustrates the peripheral circuits of the LCLK terminal and DCA terminal in a case where the DCA terminal is disposed adjacent to the LCLK terminal. The DCA terminal is pulled up to 3.0 V, which is the communication voltage for the third communication at the camera body and the intermediate accessory device. Now, if an electroconductive foreign substance 90 becomes lodged between the LCLK terminal and the DCA terminal, and the LCLK terminal and the DCA terminal are short-circuited, voltage exceeding 3.0 V may be applied to the DCA terminal. At this time, voltage exceeding the operating voltage (3.0 V) will be applied to the second/third communication interface unit of the camera body and the accessory control unit of the intermediate accessory device, which is undesirable.

Figure 13C:
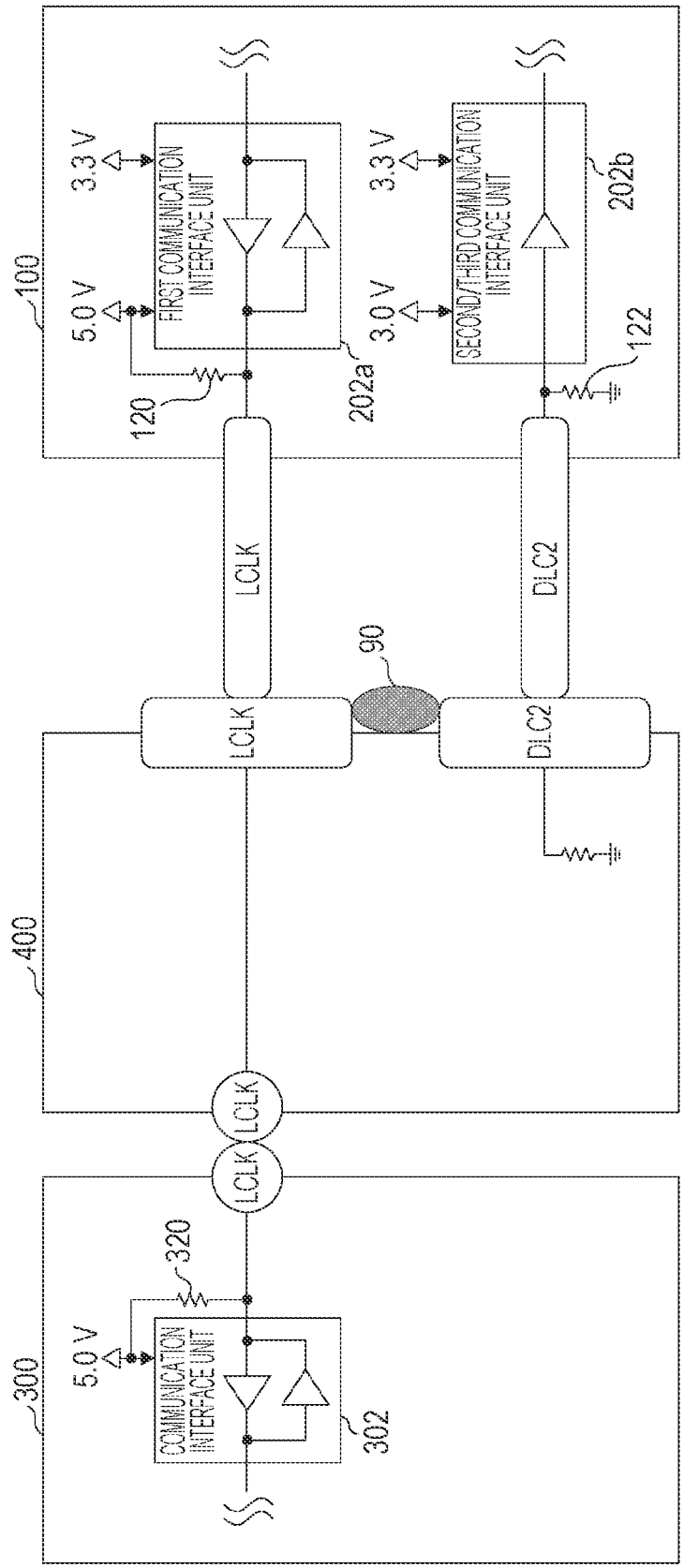

FIG. 13C illustrates the peripheral circuits of the LCLK terminal and DLC2 terminal in a case where the lens apparatus 300 is mounted to the camera body 100 via the intermediate accessory device 400. The second communication is not performed at this time, so the DLC2 terminal is not used. Accordingly, even if the LCLK terminal and the DLC2 terminal are short-circuited, the internal circuits of the camera body 100 and intermediate accessory device 400 are not readily affected in the present embodiment.

Note that in a case where the lens apparatus 200 is mounted to the camera body 100, the second communication is performed, but the communication voltage of the first communication and the second communication is 3.0 V for both. Accordingly, even in a case where the LCLK terminal and DLC2 terminal are short-circuited, excessive voltage will not be applied to the internal circuits of the camera body 100 or lens apparatus 200. According to the above, it can be said the electric contact adjacent to the electric contact group used for first communication is the DLC2 terminal not used when the lens apparatus 300 is mounted.

Further, in a case where the lens apparatus 200 is mounted to the camera body 100, the second communication and the third communication can be performed at the same time. In this case, even if the DLC2 terminal and the DCA terminal are short-circuited, excessive voltage will not be applied to the internal circuits of the camera body 100 or lens apparatus 200, since the communication voltage for the second communication and the third communication is 3.0 V. Accordingly, the CS terminal or DCA terminal is preferably adjacent to the DLC2 terminal. Also, the DLC2 terminal is disposed between the LCLK terminal and the CS terminal or DCA terminal in this case, so short-circuiting of the LCLK terminal and the CS terminal or DCA terminal can be made to occur less readily. Accordingly, short-circuiting among electric contacts that perform communication at different communication voltages can be prevented when mounting the lens apparatus 300 to the camera body 100 via the intermediate accessory device 400.

Although a preferred embodiment of the present invention has been described, the present invention is not restricted to this embodiment, and various modifications and alterations may be made within the scope of the essence thereof. Although an example has been described in the present embodiment where the camera body 100 has electric contacts 1009 through 1011 as a second camera-side electric contact group, and second communication and third communication can be performed with mounted accessory devices, this is not restrictive. For example, the camera body 100 may have just the electric contacts 1010 and 1011 as the second camera-side electric contact group. In this case, the camera body 100 will not have the electric contact 1009. Accordingly, the camera body 100 will not be able to handle the above-described second communication. Conversely, the camera body 100 may have just the electric contact 1009 as the second camera-side electric contact group. In this case, the camera body 100 will not have the electric contacts 1010 and 1011. Accordingly, the camera body 100 will not be able to handle the above-described third communication.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An imaging apparatus to which a lens apparatus is detachably mountable, the imaging apparatus comprising:
   a mount unit; and
   a contact holding member provided to the mount unit where a plurality of electric contacts are arrayed,
   wherein the plurality of electric contacts include:
   a first power contact configured to supply first power,
   a second power contact configured to supply second power,
   a first electric contact group configured to be used to perform first communication, and
   a second electric contact group configured to be used to perform communication that is different from the first communication, and
   wherein, where a direction of rotation of the lens apparatus with respect to the imaging apparatus when mounting the lens apparatus to the imaging apparatus directly is a first direction, the second electric contact group, the first electric contact group, the first power contact and the second power contact are arrayed in the order of the second electric contact group, the first electric contact group, the second power contact and the first power contact in the first direction.

2. The imaging apparatus according to claim 1, wherein the imaging apparatus transmits a control command to control the mounted lens apparatus, using the first electric contact group.

3. The imaging apparatus according to claim 1,
   wherein the second electric contact group includes
   an electric contact configured to be capable of transmission and reception of data, and
   an electric contact configured to perform notification of timing relating to communication using the second electric contact group.

4. The imaging apparatus according to claim 3,
   wherein, in a state where a plurality of accessories are mounted to the imaging apparatus, the imaging apparatus performs communication with the plurality of accessories using the second electric contact group.

5. The imaging apparatus according to claim 4,
   wherein the communication using the second electric contact group is broadcast communication where data is transmitted from one of the plurality of accessories and the imaging apparatus to all the other of the plurality of accessories and the imaging apparatus, and
   wherein the timing includes a timing of starting the broadcast communication.

6. The imaging apparatus according to claim 4,
   wherein the communication using the second electric contact group is broadcast communication where data is transmitted from one of the plurality of accessories and the imaging apparatus to all the other of the plurality of accessories and the imaging apparatus, and
   wherein the timing includes a timing of completing preparation for reception of data at all the other of the plurality of accessories and the imaging apparatus.

7. The imaging apparatus according to claim 4,
   wherein the communication using the second electric contact group is peer-to-peer communication performed between one of the plurality of accessories and the imaging apparatus, and
   wherein the timing includes a timing of completing transmission of data at the side of the one of the plurality of accessories or the imaging apparatus transmitting data in the peer-to-peer communication.

8. The imaging apparatus according to claim 4,
   wherein the communication using the second electric contact group is peer-to-peer communication performed between one of the plurality of accessories and the imaging apparatus, and
   wherein the timing includes a timing of completing preparation for reception of data at the side of the one of the plurality of accessories or the imaging apparatus receiving data in the peer-to-peer communication.

9. The imaging apparatus according to claim 1,
wherein the second electric contact group includes an electric contact capable of receiving data transmitted from the lens apparatus, and
wherein the data transmitted from the lens apparatus using the second electric contact group is data specified by the imaging apparatus by communication using the first electric contact group.

10. The imaging apparatus according to claim 1,
wherein the first electric contact group includes
an electric contact configured to be capable of outputting a clock signal,
an electric contact configured to be capable of transmitting data synchronously with the clock signal, and
an electric contact configured to be capable of receiving data transmitted synchronously with the clock signal.

11. The imaging apparatus according to claim 1,
wherein the plurality of electric contacts include, disposed on the opposite side of the first electric contact group from the second electric contact group:
an electric contact used to determine whether or not a lens apparatus is mounted to the imaging apparatus,
an electric contact used to determine a type of lens apparatus mounted to the imaging apparatus, and
an electric contact configured to set a ground level of the second power.

12. The imaging apparatus according to claim 1, wherein the imaging apparatus is capable of mounting any one of lens apparatuses including a first lens apparatus and a second lens apparatus,
wherein the imaging apparatus is configured to perform communication using the first electric contact group with both of the first lens apparatus and the second lens apparatus, and
wherein the imaging apparatus is configured to perform communication using the second electric contact group with the second lens apparatus but is configured not to perform communication using the second electric contact group with the first lens apparatus.

13. The imaging apparatus according to claim 12, wherein the first lens apparatus is configured to be mounted to the imaging apparatus only via an intermediate accessory.

14. The imaging apparatus according to claim 1,
wherein the contact holding member has two tiers each of which holds electric contacts included in the plurality of electric contacts,
wherein the first electric contact group and the second electric contact group are held on one of the two tiers and the first power contact and the second power contact are held on the other of the two tiers, and
wherein the plurality of electric contacts include an electric contact used to determine whether or not a lens apparatus is mounted to the imaging apparatus, at a location on the same tier with the first electric contact group and opposite from the second electric contact group in between the first electric contact group.

15. The imaging apparatus according to claim 1,
wherein the contact holding member has two tiers each of which holds electric contacts included in the plurality of electric contacts,
wherein the first electric contact group and the second electric contact group are held on one of the two tiers and the first power contact and the second power contact are held on the other of the two tiers, and
wherein the plurality of electric contacts include an electric contact used to determine a type of lens apparatus mounted to the imaging apparatus at a location on the same tier with the first power contact and the second power contact.

16. An accessory detachably mountable to an imaging apparatus, the accessory comprising:
a mount unit; and
a contact holding member provided on the mount unit where a plurality of electric contacts of the accessory are arrayed,
wherein the plurality of electric contacts includes:
a first power contact configured to receive first power,
a second power contact configured to receive second power,
a third electric contact group configured to be used to perform first communication, and
a fourth electric contact group configured to be used to perform communication that is different from the first communication,
wherein the contact holding member has two tiers each of which holds electric contacts included in the plurality of electric contacts,
wherein the third electric contact group is held on one of the two tiers and the first power contact and the second power contact are held on the other of the two tiers, and
wherein, where a direction of rotation of the accessory when mounting the accessory is a first direction, the third electric contact group, the first power contact and the second power contact are arrayed in the order of the third electric contact group, the second power contact and the first power contact in the first direction.

17. The accessory according to claim 16, wherein the imaging apparatus is capable of mounting any one of lens apparatuses including a first lens apparatus and a second lens apparatus,
wherein the imaging apparatus includes a plurality of electric contacts including:
a first electric contact group used to perform the first communication with at least one of accessory mounted to the imaging apparatus, and
a second electric contact group used to perform communication that is different from the first communication with at least one of accessory mounted to the imaging apparatus,
wherein the imaging apparatus is configured to perform communication using the first electric contact group with both of the first lens apparatus and the second lens apparatus, and
wherein the imaging apparatus is configured to perform communication using the second electric contact group with the second lens apparatus but is configured not to perform communication using the second electric contact group with the first lens apparatus.

18. The accessory according to claim 17, wherein the first lens apparatus is configured to be mounted to the imaging apparatus only via an intermediate accessory.

19. The accessory according to claim 16,
wherein the plurality of electric contacts of the accessory include:
an electric contact used for indicating that a lens apparatus is mounted to the imaging apparatus at a location on the same tier with the third electric contact group, and
an electric contact used for indicating a type of a mounted lens apparatus at a location on the same tier with the first power contact and the second power contact.

20. The accessory according to claim 16, wherein the accessory is a lens apparatus having an optical system.

21. The accessory according to claim 16, wherein the accessory is an intermediate accessory detachably mountable between the imaging apparatus and a lens apparatus.

22. A camera system, comprising:
an imaging apparatus; and
an accessory configured to be detachably mountable to the imaging apparatus,
wherein the imaging apparatus includes a first mount unit and a contact holding member provided to the mount unit where a plurality of electric contacts are arrayed, the plurality of electric contacts of the imaging apparatus including:
a first power contact used to supply first power,
a second power contact used to supply second power,
a first electric contact group used to perform first communication with at least one of accessory mounted to the imaging apparatus, and
a second electric contact group used to perform communication that is different from the first communication with at least one of accessory mounted to the imaging apparatus,
wherein the contact holding member has two tiers each of which holds electric contacts included in the plurality of electric contacts of the imaging apparatus,
wherein the first electric contact group and the second electric contact group are held on one of the two tiers and the first power contact and the second power contact are held on the other of the two tiers,
wherein the accessory includes a second mount unit capable of coupling with the first mount unit, and where a plurality of electric contacts are arrayed, the plurality of electric contacts of the accessory including:
a third electric contact group made up of electric contacts that comes into contact with electric contacts included in the first electric contact group in a state where the accessory is mounted to the imaging apparatus directly, and
a fourth electric contact group made up of electric contacts that comes into contact with electric contacts included in the second electric contact group in a state where the accessory is mounted to the imaging apparatus directly, and
wherein, where a direction of rotation of the accessory with respect to the imaging apparatus when mounting the accessory directly to the imaging apparatus is a first direction, the second electric contact group and the first electric contact group are arrayed in the order of the second electric contact group and the first electric contact group in the first direction.

23. The camera system according to claim 22, wherein the imaging apparatus is capable of mounting any one of lens apparatuses including a first lens apparatus and a second lens apparatus,
wherein the imaging apparatus is configured to perform communication using the first electric contact group with both of the first lens apparatus and the second lens apparatus, and
wherein the imaging apparatus is configured to perform communication using the second electric contact group with the second lens apparatus but is configured not to perform communication using the second electric contact group with the first lens apparatus.

* * * * *